United States Patent
Yasutomi et al.

(10) Patent No.: US 11,663,786 B2
(45) Date of Patent: May 30, 2023

(54) EYEWEAR DISPLAY SYSTEM

(71) Applicant: TOPCON CORPORATION, Tokyo (JP)

(72) Inventors: Satoshi Yasutomi, Tokyo (JP); Takeshi Kikuchi, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 23 days.

(21) Appl. No.: 17/313,260

(22) Filed: May 6, 2021

(65) Prior Publication Data
US 2021/0350627 A1   Nov. 11, 2021

(30) Foreign Application Priority Data
May 8, 2020   (JP) .............................. JP2020-082864

(51) Int. Cl.
*G06T 19/00*   (2011.01)
*G06F 30/17*   (2020.01)
*G01S 17/42*   (2006.01)

(52) U.S. Cl.
CPC ............ *G06T 19/006* (2013.01); *G01S 17/42* (2013.01); *G06F 30/17* (2020.01)

(58) Field of Classification Search
CPC ........ G06T 19/006; G06F 30/17; G01S 17/42
USPC ......................................................... 345/633
See application file for complete search history.

(56) References Cited

U.S. PATENT DOCUMENTS

| 2016/0069670 A1* | 3/2016 | Ruhland | G01B 11/002 356/610 |
| 2018/0052232 A1* | 2/2018 | Ohtomo | G01S 17/08 |
| 2019/0094021 A1* | 3/2019 | Singer | G01C 1/04 |

FOREIGN PATENT DOCUMENTS

| EP | 3299764 A1 | 3/2018 |
| JP | 2018-28464 A | 2/2018 |

* cited by examiner

*Primary Examiner* — Hai Tao Sun
(74) *Attorney, Agent, or Firm* — Thomas W. Cole; Calderon Safran & Cole P.C.

(57) ABSTRACT

Provided is an eyewear display system includes: a scanner including a measuring unit configured to acquire three-dimensional coordinates, a point cloud data acquiring unit configured to acquire point cloud data, and a communication unit; an eyewear device including a display, a relative position detection sensor, a relative direction detection sensor, and a communication unit; a storage device including CAD design data of an observation site; and a data processing device configured to synchronize a coordinate space of the scanner, a coordinate space of the eyewear device, and a coordinate space of the CAD design data, and convert observation data OD and/or observation data prediction PD into data in the coordinate space of the CAD design data, such that the eyewear device displays the observation data OD or observation data prediction PD on the display by superimposing the observation data OD or observation data prediction PD on an actual landscape.

10 Claims, 19 Drawing Sheets

EYEWEAR DISPLAY SYSTEM

CROSS-REFERENCE TO RELATED APPLICATION

The present application claims priority under 35 U.S.C. § 119 to Japanese Patent Application No. 2020-082864 filed May 8, 2020. The contents of this application are incorporated herein by reference in their entirely.

TECHNICAL FIELD

The present invention relates to an eyewear display system, and more specifically to an eyewear display system for assisting point cloud data observation using a ground-mounted scanner.

BACKGROUND

Conventionally, point cloud data observation using a ground-mounted scanner has been known (for example, refer to JP2018-28464A). In point cloud data observation, in order to realize desired observation accuracy, it is necessary to secure point cloud density. The point cloud density depends on a distance from the scanner and a rotation speed of the scanner. That is, in a region at a short distance from the scanner, the point cloud density is high, but the point cloud density becomes lower with increasing distance from the scanner.

Although the point cloud density is high when the rotation speed of the scanner is low, the point cloud density is low when the rotation speed is high. Therefore, in order to secure a desired point cloud density, point cloud data are acquired by setting a plurality of scanner installation points so that measurement regions overlap to some degree.

Therefore, in point cloud observation, measurements are made by setting scanner installation points so that measurement regions overlap.

SUMMARY OF INVENTION

Technical Problem

Whether observation has been performed so as to achieve a desired point cloud density by acquired point cloud data in the entire observation region cannot be known unless the data are brought to an office and confirmed by being converted into an absolute coordinate system and displayed, and therefore, when overlapping is insufficient, remeasurement is required.

Thus, at an observation site, a problem occurs in which it is difficult to set a next instrument point so as to prevent insufficient data while being aware of overlap of point cloud data.

The present invention has been made in view of these circumstances, and an object thereof is to provide a technology that enables setting of a next instrument point while confirming a point cloud data acquisition state or observation data prediction at a survey site in point cloud data observation using a ground-mounted scanner.

Solution to Problem

In order to achieve the object described above, an eyewear display system according to a first aspect of the present invention includes: a scanner including a measuring unit configured to irradiate distance-measuring light, and acquire three-dimensional coordinates of an irradiation point by measuring a distance and an angle to the irradiation point, a point cloud data acquiring unit configured to acquire point cloud data as observation data by rotationally irradiating distance-measuring light in the vertical direction and the horizontal direction by the measuring unit, and a communication unit; an eyewear device including a display, a relative position detection sensor configured to detect a position of the device, a relative direction detection sensor configured to detect a direction that the device faces, and a communication unit; a storage device including CAD design data of an observation site; and a data processing device including a synchronization measuring unit configured to receive information on a position and a direction of the scanner and information on a position and a direction of the eyewear device, and synchronize a coordinate space of the scanner, a coordinate space of the eyewear device, and a coordinate space of the CAD design data, wherein the synchronization measuring unit converts the CAD design data into information on a wire frame viewed from the eyewear device, converts the observation data into data in the coordinate space of the CAD design data, and outputs the information and the observation data to the eyewear device, and the eyewear device displays the wire frame and the observation data on the display by superimposing the wire frame and the observation data on an actual landscape.

In the aspect described above, it is also preferable that the eyewear device displays the point cloud data so that a first region with point cloud density falling within a predetermined range and a second region disposed at an outer circumferential side of the first region are distinguishable.

An eyewear display system according to a second aspect of the present invention includes: a scanner including a measuring unit configured to irradiate distance-measuring light, and acquire three-dimensional coordinates of an irradiation point by measuring a distance and an angle to the irradiation point, a point cloud data acquiring unit configured to acquire point cloud data by rotationally irradiating distance-measuring light in the vertical direction and the horizontal direction by the measuring unit, and a communication unit; an eyewear device including a display, a relative position detection sensor configured to detect a position of the device, a relative direction detection sensor configured to detect a direction that the device faces, and a communication unit; a storage device including CAD design data of an observation site; and a data processing device including a synchronization measuring unit configured to receive information on a position and a direction of the scanner and information on a position and a direction of the eyewear device, and synchronize a coordinate space of the scanner, a coordinate space of the eyewear device, and a coordinate space of the CAD design data, wherein the synchronization measuring unit converts the CAD design data into information on a wire frame viewed from the eyewear device and outputs the information to the eyewear device, the eyewear device is configured to be capable of temporarily designating a next instrument point on display of the display, the data processing device includes an observation data prediction calculating unit configured to calculate coordinates of the next instrument point temporarily designated, calculate observation data prediction as point cloud data to be acquired when the scanner is installed at the next instrument point, and output the observation data prediction to the eyewear device, and the eyewear device displays the wire frame and the observation data prediction on the display by superimposing the wire frame and the observation data prediction on an actual landscape.

In the first aspect described above, it is also preferable that the eyewear device is configured to be capable of temporarily designating a next instrument point on display of the display, calculates coordinates of the next instrument point temporarily designated, and outputs the coordinates to the data processing device, the data processing device includes an observation data prediction calculating unit configured to acquire coordinates of the next instrument point, calculate observation data prediction of point cloud data to be acquired when the scanner is installed at the next instrument point, and output the observation data prediction to the eyewear device, and the eyewear device displays the wire frame and the observation data prediction on the display by superimposing the wire frame and the observation data prediction on an actual site landscape.

In the aspect described above, it is also preferable that the eyewear device displays the observation data prediction so that a first region with point cloud density falling within a predetermined range and a second region disposed at an outer circumferential side of the first region are distinguishable.

In the aspect described above, it is also preferable that the observation data prediction is two-dimensionally or three-dimensionally displayed, or displayed to be displayed.

In the aspect described above, it is also preferable that the observation data prediction is calculated in consideration of performance of the scanner and a three-dimensional structure in the CAD design data.

BENEFIT OF INVENTION

With the eyewear display system according to the aspects described above, in point cloud data observation using a ground-mounted scanner, a next instrument point can be set while confirming a point cloud data acquisition state or observation data prediction at a survey site.

DESCRIPTION OF EMBODIMENTS

Hereinafter, preferred embodiments of the present invention will be described with reference to the drawings, however, the present invention is not limited to these. The same components common to the embodiment and the modifications are provided with the same reference signs, and overlapping descriptions are omitted as appropriate.

Embodiment

Figure 1:
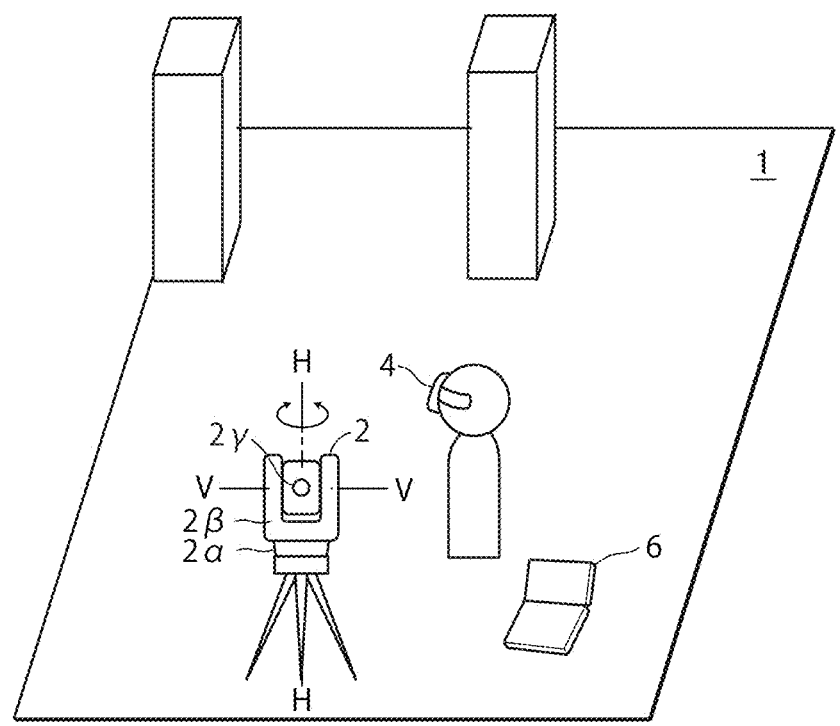
FIG. 1 is an external perspective view of an eyewear display system according to an embodiment of the present invention.

FIG. 1 is an external perspective view of an eyewear display system (hereinafter, simply referred to as "display system") 1 according to an embodiment of the present invention, and illustrates a work image at a measurement site. The display system 1 according to the present embodiment includes a scanner 2, an eyewear device 4, and a processing PC 6.

The scanner 2 is installed at an arbitrary point via a leveling base mounted on a tripod. The scanner 2 includes a base portion 2α provided on the leveling base, a bracket portion 2β that rotates horizontally about an axis H-H on the base portion 2α, and a light projecting portion 2γ that rotates vertically at the center of the bracket portion 2β. The eyewear device 4 is worn on the head of a worker. The processing PC 6 is installed at an observation site.

Figure 2:
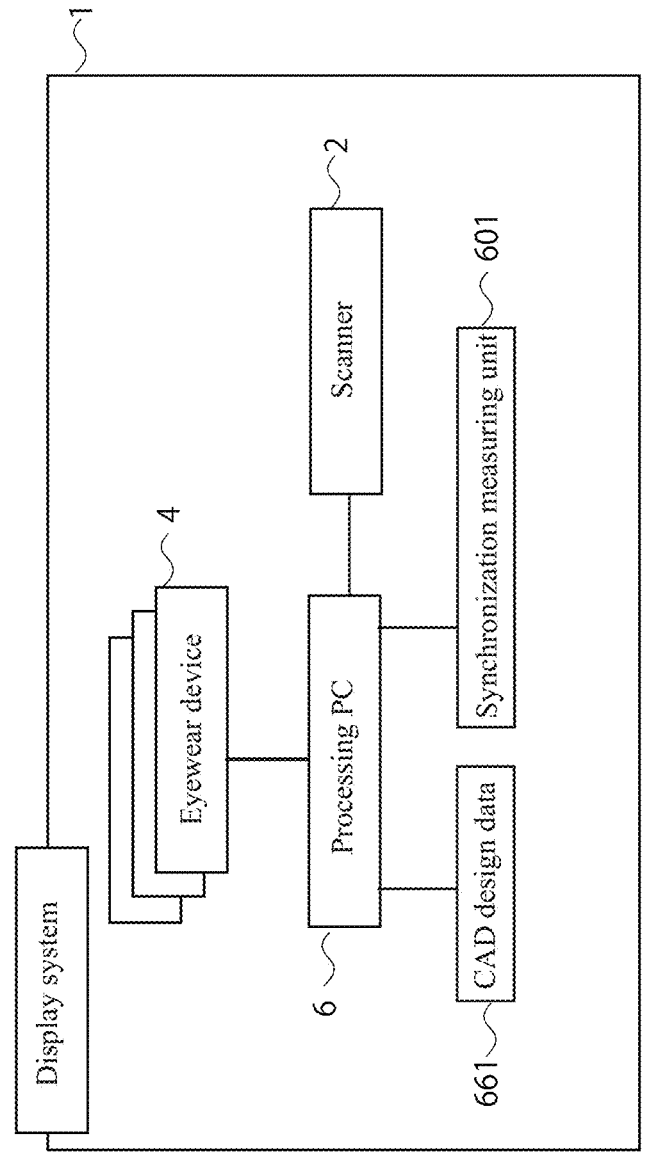
FIG. 2 is a configuration block diagram of the display system according to the same embodiment.

FIG. 2 is a configuration block diagram of the same display system 1. In the display system 1, the scanner 2 and the eyewear device 4 are connected to the processing PC 6 wirelessly or by wire. The number of eyewear devices 4 is not particularly limited, and may be one or plural in number. When the number of eyewear devices 4 is plural in number, each eyewear device 4 is configured so as to be identified by its unique ID, etc.

Scanner

Figure 3:
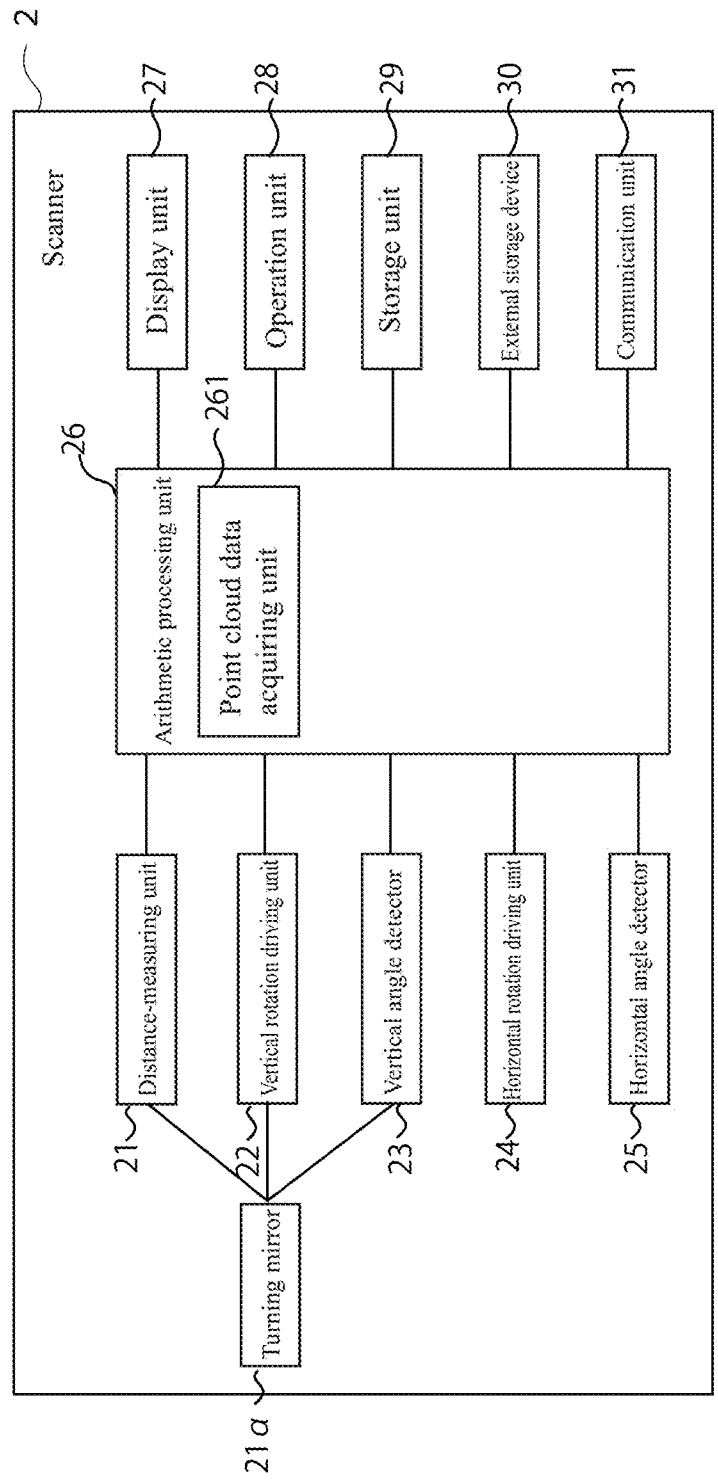
FIG. 3 is a configuration block diagram of a scanner in the same display system.

FIG. 3 is a configuration block diagram of the scanner 2 according to the present embodiment. The scanner 2 includes a distance-measuring unit 21, a vertical rotation driving unit 22, a vertical angle detector 23, a horizontal rotation driving unit 24, a horizontal angle detector 25, an arithmetic processing unit 26, a display unit 27, an operation unit 28, a storage unit 29, an external storage device 30, and a communication unit 31. In the present embodiment, the distance-measuring unit 21, the vertical angle detector 23, and the horizontal angle detector 25 constitute the measuring unit.

The distance-measuring unit 21 includes a light transmitting unit, a light receiving unit, a light transmitting optical system, a light receiving optical system sharing optical elements with the light transmitting optical system, and a turning mirror 21α. The light transmitting unit includes a light emitting element such as a semiconductor laser, and emits pulsed light as distance-measuring light. The emitted distance-measuring light enters the turning mirror 21α through the light transmitting optical system, and is deflected by the turning mirror 21α and irradiated onto a measuring object. The turning mirror 21α rotates around a rotation axis V-V by being driven by the vertical rotation driving unit 22.

The distance-measuring light retroreflected by the measuring object enters the light receiving unit through the turning mirror 21α and the light receiving optical system. The light receiving unit includes a light receiving element such as a photodiode. A part of the distance-measuring light enters the light receiving unit as internal reference light, and based on the reflected distance-measuring light and internal reference light, a distance to an irradiation point is obtained by the arithmetic processing unit 26.

The vertical rotation driving unit 22 and the horizontal rotation driving unit 24 are motors, and are controlled by the arithmetic processing unit 26. The vertical rotation driving unit 22 rotates the turning mirror 21α about the axis V-V in the vertical direction. The horizontal rotation driving unit 24 rotates the bracket portion 2β about the axis H-H in the horizontal direction.

The vertical angle detector 23 and the horizontal angle detector 25 are encoders. The vertical angle detector 23 measures a rotation angle of the turning mirror 21α in the vertical direction. The horizontal angle detector 25 measures a rotation angle of the bracket portion 2β in the horizontal direction. As a result, the vertical angle detector 23 and the horizontal angle detector 25 constitute an angle measuring unit that measures an angle of an irradiation direction of the distance-measuring light.

The arithmetic processing unit 26 is a microcontroller configured by mounting, for example, a CPU, a ROM, a RAM, etc., on an integrated circuit. The arithmetic processing unit 26 calculates a distance to an irradiation point of each one-pulse light of the distance-measuring light based on a time difference between a light emission timing of the light transmitting unit and a light receiving timing of the light receiving unit (a reflection time of the pulsed light). In addition, the arithmetic processing unit 26 calculates an irradiation angle of the distance-measuring light at this time, and calculates an angle of the irradiation point.

The arithmetic processing unit 26 includes a point cloud data acquiring unit 261 configured by software. The point cloud data acquiring unit 261 acquires entire circumferential point cloud data by acquiring three-dimensional coordinates of each irradiation point by performing entire circumferential (360°) scanning (full dome scanning) with the distance-measuring light by controlling the distance-measuring unit 21, the vertical rotation driving unit 22, and the horizontal rotation driving unit 24.

The display unit 27 is, for example, a liquid crystal display. The operation unit 28 includes a power key, numeric keys, a decimal key, plus/minus keys, an enter key, and a scroll key, etc., and is configured to enable a worker to operate the scanner 2 and input information into the scanner 2.

The storage unit 29 is, for example, a hard disk drive, and stores programs for executing functions of the arithmetic processing unit 26.

The external storage device 30 is, for example, a memory card, etc., and stores various data acquired by the scanner 2.

The communication unit 31 enables communication with an external network, and for example, connects to the Internet by using an Internet protocol (TCP/IP), and transmits and receives information to and from the eyewear device 4 and the processing PC 6.

Eyewear Device

Figure 4:
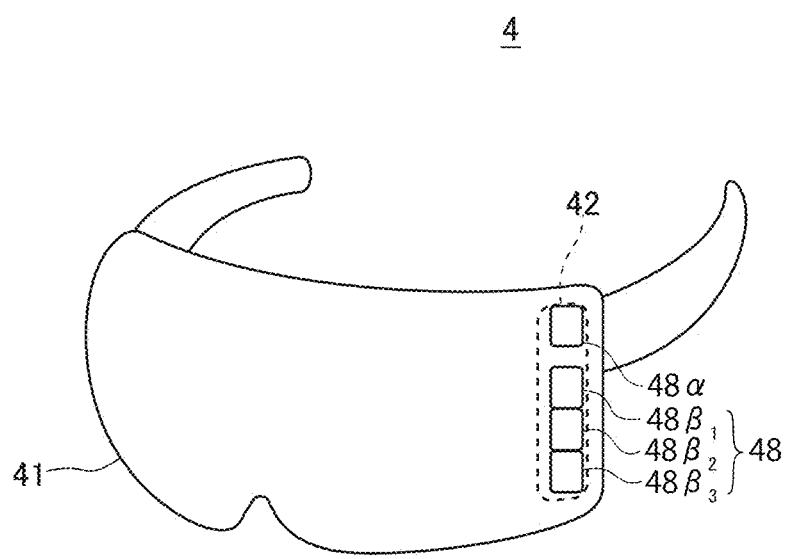
FIG. 4 is an external perspective view of an eyewear device in the same display system.
Figure 5:
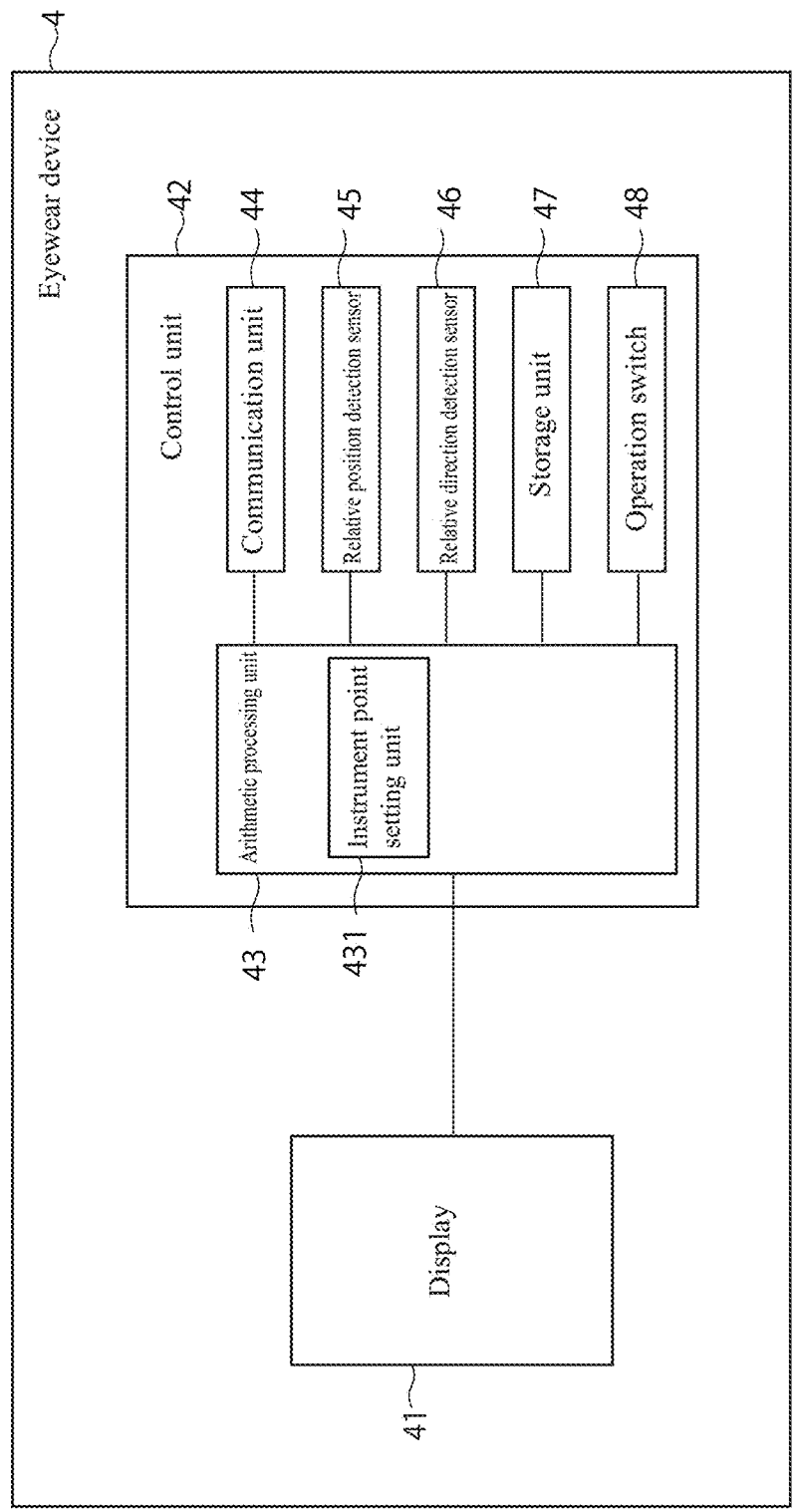
FIG. 5 is a configuration block diagram of the same eyewear device.

FIG. 4 is an external perspective view of the eyewear device 4 according to the first embodiment, and FIG. 5 is a configuration block diagram of the eyewear device 4. The eyewear device 4 is a wearable device to be worn on the head of a worker. The eyewear device 4 includes a display 41 and a control unit 42.

The display 41 is a goggles-lens-shaped transmissive display that covers the eyes of the worker when the worker wears the display. As an example, the display 41 is an optical see-through display using a half mirror, and is configured to enable observation of a video image formed by synthesizing a real image of a landscape of the site (hereinafter, also referred to as "actual landscape") and a virtual image received by the control unit 42 by superimposing the virtual image on the real image.

The control unit 42 includes an arithmetic processing unit 43, a communication unit 44, a relative position detection sensor (hereinafter, simply referred to as "relative position sensor") 45, a relative direction detection sensor (hereinafter, simply referred to as "relative direction sensor") 46, a storage unit 47, and an operation switch 48.

The arithmetic processing unit 43 is a microcomputer configured by mounting at least a CPU and a memory (RAM, ROM) on an integrated circuit. The arithmetic processing unit 43 outputs information on a position and a direction of the eyewear device 4 detected by the relative position sensor 45 and the relative direction sensor 46 to the processing PC 6.

In addition, the arithmetic processing unit 43 receives three-dimensional CAD (Computer Aided Design) design data 661 from the processing PC 6 and displays a wire frame on the display 41 by superimposing it on a landscape of the site. The CAD design data 661 is a three-dimensional design drawing of the observation site, created by using CAD.

Further, the arithmetic processing unit 43 displays point cloud data acquired by observation by the scanner 2 and converted into a synchronized coordinated system by the processing PC 6 by superimposing the point cloud data on the actual landscape and the wire frame on the display 41. Hereinafter, point cloud data acquired by observation by the scanner 2 is referred to as "observation data OD.")

The arithmetic processing unit 43 further includes an instrument point setting unit 431 configured by software. The instrument point setting unit 431 sets a next instrument point according to a worker's command on the display 41 displaying the landscape of the site. To set a next instrument point, the instrument point setting unit 341 displays a cross pointer for temporarily designating a next instrument point on the display displaying the landscape of the site, and when the display of the cross pointer matches a point that the worker desires to set as a next instrument point, the worker presses down a function button for executing temporary designation (function button $48\beta_1$ in FIG. 10C) to temporarily designate the point as the next instrument point. The instrument point setting unit 431 calculates coordinates of the temporarily designated next instrument point as a point on a ground plane surface in the coordinate space of the superimposed CAD design data 661, and outputs the coordinates to the processing PC 6. In the temporarily designated state, the instrument point setting unit 431 sets the next instrument point in response to an input of determination by the worker. Setting of an instrument point will be described in detail with reference to FIGS. 10A to 10D in the following description of a first point cloud observation method.

The communication unit 44 enables communication with an external network, and connects to the Internet by using an Internet protocol (TCP/IP) and transmits and receives information to and from the processing PC 6.

The relative position sensor 45 performs wireless positioning from a GPS antenna, a Wi-Fi (registered trademark) access point, and an ultrasonic oscillator, etc., installed at the observation site, to detect a position of the eyewear device 4 in the observation site.

The relative direction sensor 46 consists of a combination of a triaxial accelerometer or a gyro sensor and a tilt sensor. The relative direction sensor 46 detects a tilt of the eyewear device 4 by setting the up-down direction as a Z-axis direction, the left-right direction as a Y-axis direction, and the front-rear direction as an X-axis direction.

The storage unit 47 is, for example, a memory card. The storage unit 47 stores programs that enable the arithmetic processing unit 43 to execute functions.

The operation switch 48 includes, for example, a power button 48α for turning ON/OFF a power supply of the eyewear device 4, and function buttons 48$β_1$, 48$β_2$, and 48$β_3$ for performing different functions depending on processing to be executed, as illustrated in FIG. 4. Functions of the function buttons 48$β_1$, 48$β_2$, and 48$β_3$ are displayed on the display 41.

Processing PC

Figure 6:
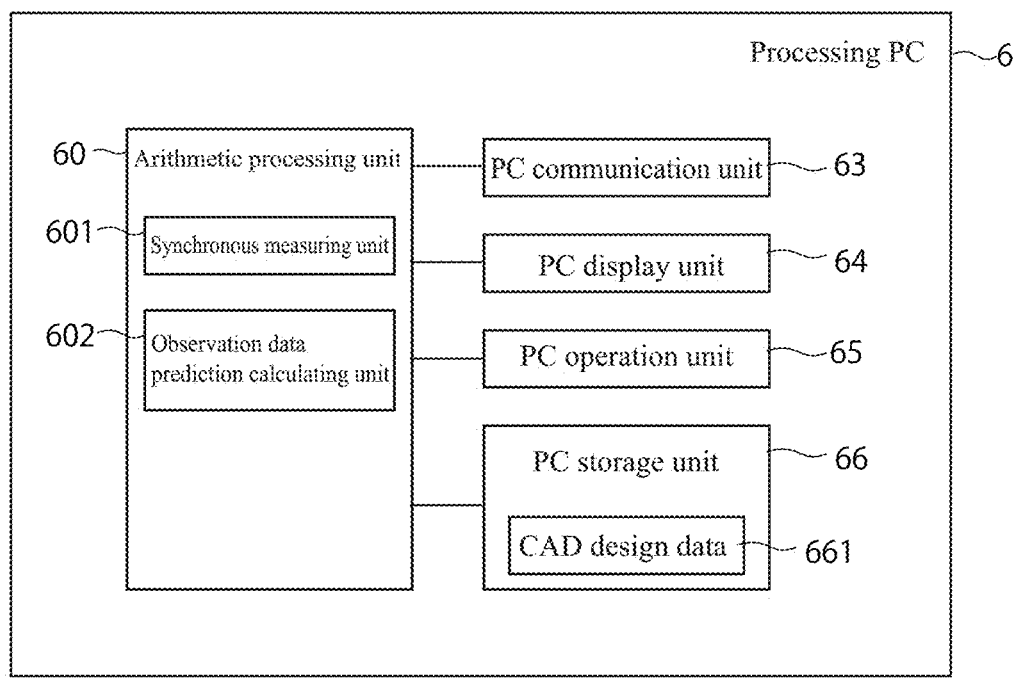
FIG. 6 is a configuration block diagram of a processing PC according to the same embodiment.

FIG. 6 is a configuration block diagram of the processing PC 6 according to the present embodiment. The processing PC 6 is a general-purpose personal computer, a dedicated hardware using a PLD (Programmable Logic Device), etc., a tablet terminal, or a smartphone, etc. The processing PC 6 includes at least an arithmetic processing unit 60, a PC communication unit 63, a PC display unit 64, a PC operation unit 65, and a PC storage unit 66. In the present embodiment, the arithmetic processing unit 60 is a data processing device, and the PC storage unit 66 is a storage device.

The PC communication unit 63 enables communication with an external network, and connects to the Internet by using an Internet protocol (TCP/IP), and transmits and receives information to and from the scanner 2 and the eyewear device 4.

The PC display unit 64 is, for example, a liquid crystal display. The PC operation unit 65 is, for example, a keyboard, a mouse, etc., and enables various inputs, selections, and determinations, etc.

The PC storage unit 66 is, for example, an HDD drive. The PC storage unit 66 includes at least three-dimensional CAD design data 661 of the observation site.

The arithmetic processing unit 60 is a control unit configured by mounting at least a CPU and a memory (RAM, ROM, etc.) on an integrated circuit. In the arithmetic processing unit 60, a synchronization measuring unit 601 and an observation data prediction calculating unit 602 are configured by software.

The synchronization measuring unit 601 receives information on a position and a direction of the scanner 2, and information on a position and a direction of the eyewear device 4, and converts a coordinate space of the scanner 2 and a coordinate space of the CAD design data 661 so that these coordinate spaces match a coordinate space of the eyewear device 4, and transmits these to the eyewear device 4.

Hereinafter, it is referred to as synchronization (synchronize) to match coordinate spaces of information on positions and directions in the devices and design data having mutually different coordinate spaces as described above to manage relative positions and relative directions concerning respective devices in a space with an origin set at a common reference point.

The synchronization measuring unit 601 converts observation data prediction DP calculated by the observation data prediction calculating unit 602 as described later so that the observation data prediction DP matches the coordinate space of the eyewear device 4, and transmits the observation data prediction DP to the eyewear device 4.

The observation data prediction calculating unit 602 calculates observation data prediction DP when the scanner 2 is installed at a next instrument point temporarily designated by the eyewear device 4. Here, the observation data prediction DP is point cloud data predicted to be acquired by the scanner 2 when the scanner 2 is installed at the temporarily designated next instrument point. The point cloud data are calculated in consideration of performance of the scanner 2, that is, an irradiation distance of the distance-measuring light of the scanner 2, a pulse interval of the distance-measuring light, rotation speed setting of the scanner 2, and a three-dimensional structure in the CAD design data 661 by defining plane coordinates of the center of the scanner 2 as plane coordinates of the temporarily designated next instrument point.

First Point Cloud Observation Method Using Display System 1

Figure 7:
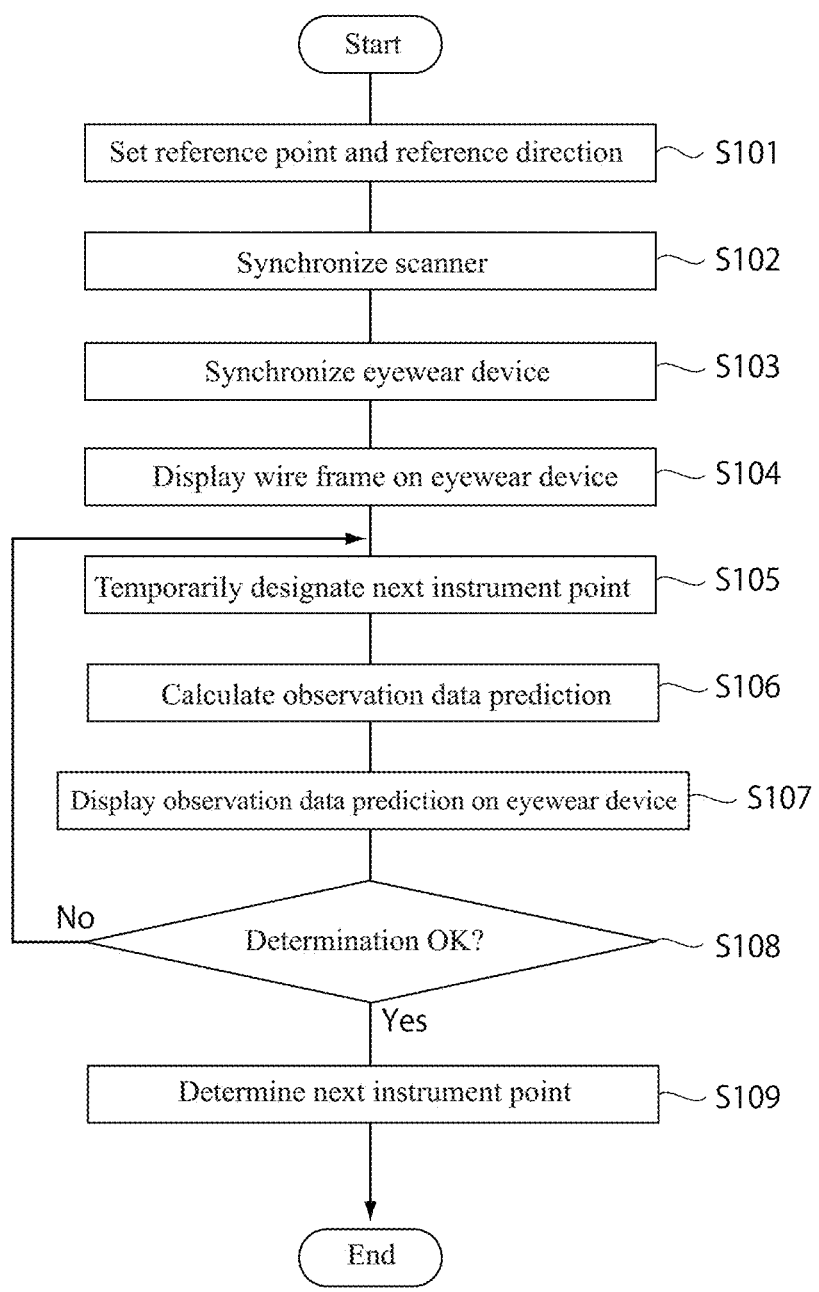
FIG. 7 is a flowchart of a first example of a point cloud observation method using the display system according to the same embodiment.
Figure 8:
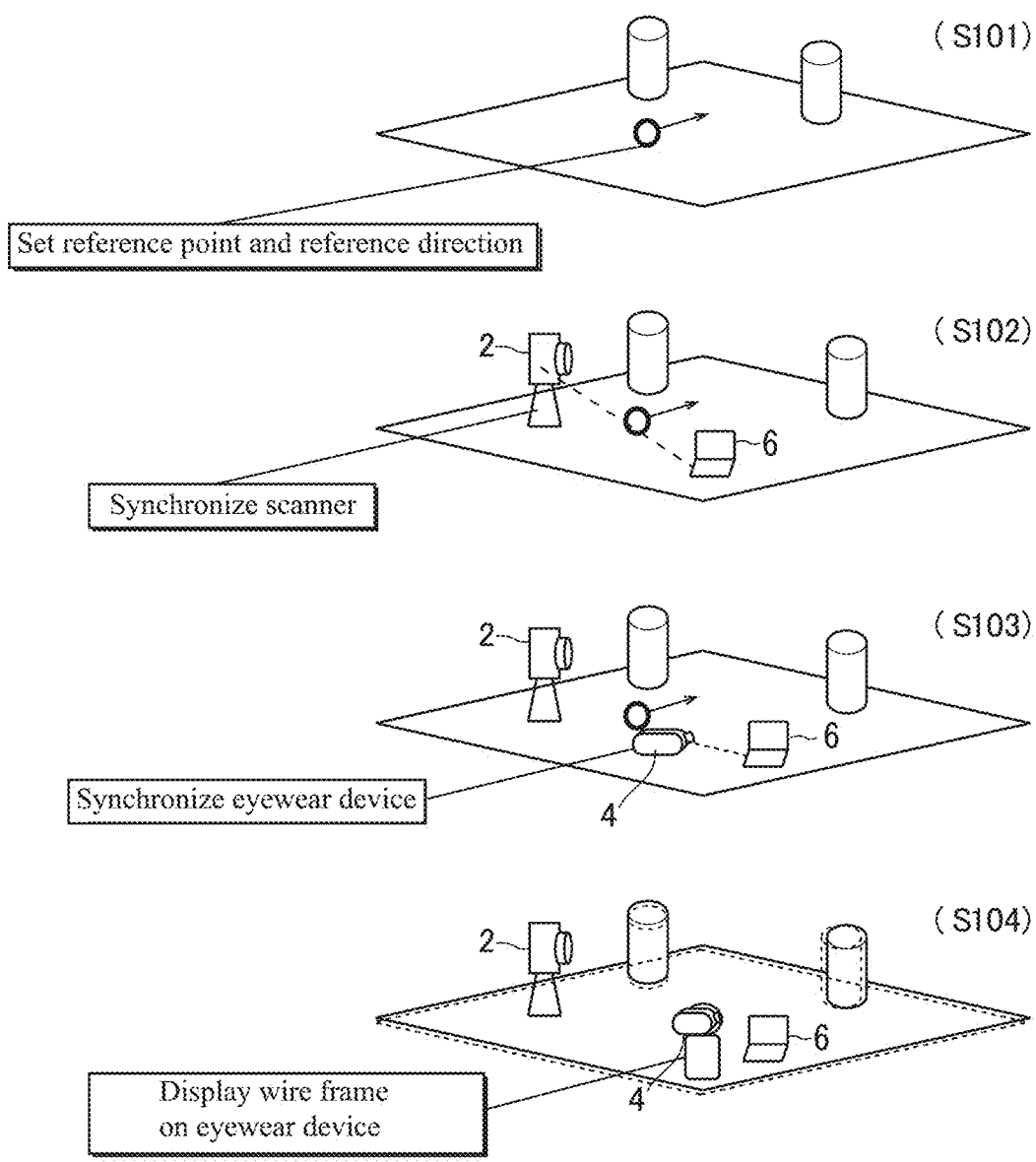
FIG. 8 is a view illustrating a work image of initial setting in the same point cloud observation method.

Next, an example of a point cloud observation method using the display system 1 will be described. FIG. 7 is a flowchart of this point cloud observation method. FIG. 8 is a work image view of Steps 101 to S104 in FIG. 7. FIGS. 9A to 9F are bird's-eye views of examples of display using the display system 1.

First, in Step S101, a worker sets a reference point and a reference direction at the observation site. As the reference point, an arbitrary point in the site is selected. The reference direction is a direction from the reference point to an arbitrarily selected characteristic point different from the reference point.

Next, in Step S102, the worker performs synchronization of the scanner 2. Specifically, the worker installs the scanner 2 at an arbitrary point in the site, and grasps absolute coordinates of the scanner 2 through observation using backward intersection, etc., including the reference point and the characteristic point selected in Step 101. The scanner 2 transmits its own coordinate information to the processing PC 6.

The synchronization measuring unit 601 of the processing PC 6 converts absolute coordinates of the reference point into (x, y, z)=(0, 0, 0) and recognizes the reference direction as a horizontal angle of 0°, and after this, in relation to information from the scanner 2, manages the relative position and the relative direction of the scanner 2 in a space with an origin set at the reference point.

Next, in Step S103, the worker performs synchronization of the eyewear device 4. Specifically, the worker installs the eyewear device 4 at the reference point, matches the center of the display 41 with the reference direction, and sets (x, y, z) of the relative position sensor 45 to (0, 0, 0) and sets (roll, pitch, yaw) of the relative direction sensor to (0, 0, 0). After this, in relation to data acquired from the eyewear device 4, the synchronization measuring unit 601 of the processing PC 6 manages the relative position and the relative direction of the eyewear device 4 in a space with an origin set at the reference point.

Synchronization of the eyewear device 4 is not limited to the method described above, and may be performed by, for example, a method in which the eyewear device 4 is provided with a laser device for indicating the center and the directional axis of the eyewear device 4, and by using a laser as a guide, the center and the directional axis are matched with the reference point and the reference direction.

Alternatively, a method is possible in which the eyewear device 4 is provided with a visual line sensor, etc., three or more characteristic points are marked in the CAD design data 661 and the actual landscape, coordinates of the eyewear device 4 are identified from angles of survey lines connecting the eyewear device 4 and the characteristic points, and are made correspondent to the coordinates of the reference point.

By executing the operation of Step S103, in Step S104, the eyewear device 4 displays a virtual image of the wire frame of the CAD design data 661 by superimposing it on an actual landscape. The relative position and the relative direction of the eyewear device 4 to the actual landscape are managed by the synchronization measuring unit 601 of the processing PC 6. Therefore, information of the CAD design data 661 synchronized with the actual landscape is transmitted from the processing PC 6 to the eyewear device 4. Then, on the display 41, a virtual image of the wire frame of the CAD design data 661 is displayed so as to be superimposed on the actual landscape as illustrated by the dashed lines.

Steps S101 to S104 described above are performed as initial setting of this display system 1.

Figure 9A:
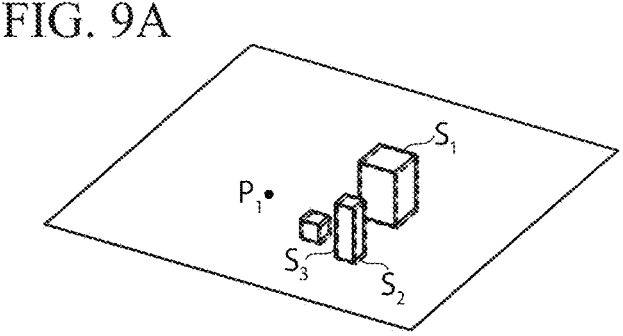
FIGS. 9A to 9F are bird's-eye views of images obtained by the display system in the same method.
Figure 9B:
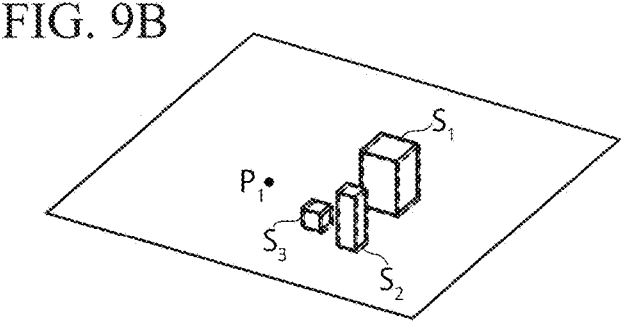

FIG. 9A illustrates an example of display on the display 41 to be observed by a worker wearing the eyewear device 4 in a state where initial setting has been completed. In FIGS. 9A to 9F, for convenience of drawing plotting, it is assumed that the instrument center of the scanner 2 is on the ground, that is, an instrument height is 0, however, in actuality, the instrument center of the scanner 2 is displaced upward by the instrument height.

In Step S105, the eyewear device 4 temporarily designates the next instrument point $P_1$ (FIG. 9B) according to a worker's designation. Details of the temporary designation are as follows.

Figure 10A:
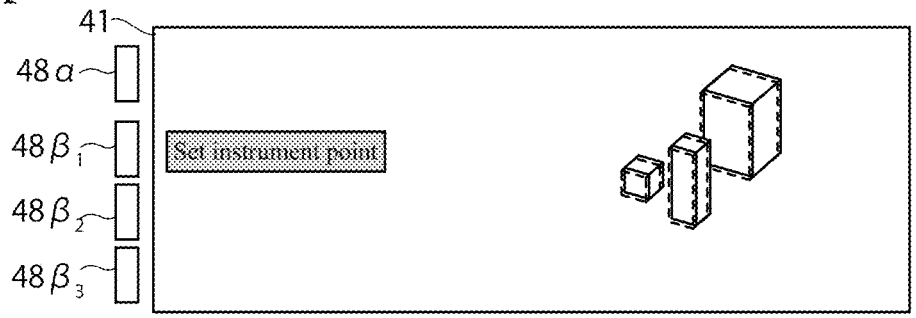
FIGS. 10A to 10D are diagrams describing temporary designation of a next instrument point in the same method.

On the display 41, as illustrated in FIG. 10A, corresponding to layout of the operation switch 48 (power button 48α, and function buttons $48\beta_1$, $48\beta_2$, and $48\beta_3$), respective functions are displayed. The worker selects an instrument point setting mode by pressing down the function button $48\beta_1$.

Figure 10B:
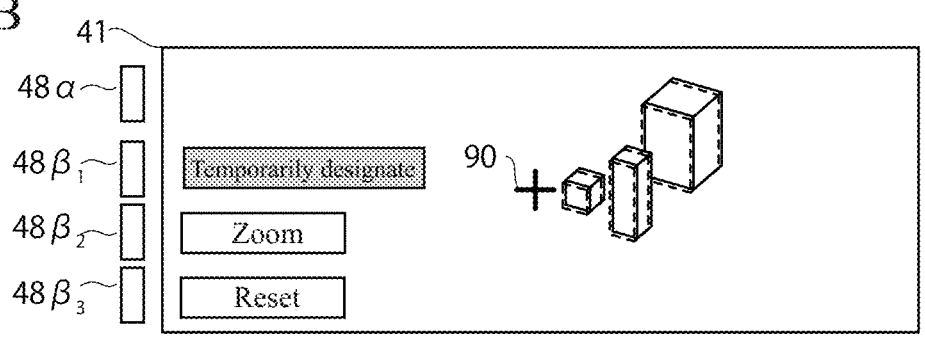

Then, as illustrated in FIG. 10B, the instrument point setting unit 431 displays a cross pointer 90 indicating a center of the display 41 at the center of the display 41. On the display 41, functions of the function buttons $48\beta_1$, $48\beta_2$, and $48\beta_3$ are displayed. Displaying in such a manner enables a worker to easily grasp functions of the buttons without paying any special attention and operate the eyewear device 4.

Figure 10C:
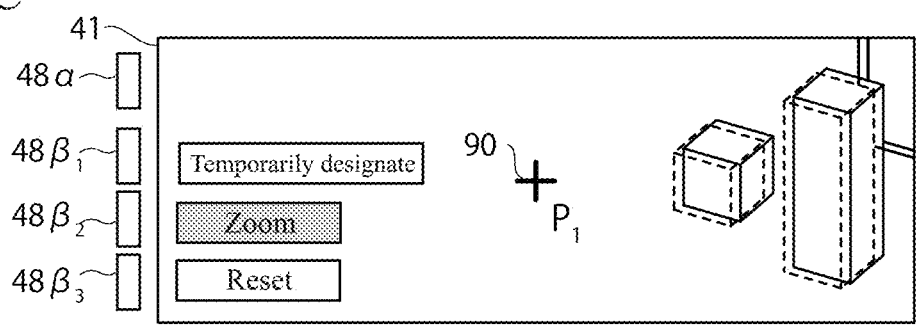

The worker temporarily designates a next instrument point $P_1$ as a point on a space by placing the pointer 90 on the position to be set as a next instrument point and pressing down the function button $48\beta_1$ while confirming display on the display 41. At this time, as illustrated in FIG. 10C, the worker may enlarge the display by pressing the function button $48\beta_2$ and temporarily designate the next instrument point $P_1$. Pressing the function button $48\beta_2$ once enlarges the display at a predetermined magnification. Accordingly, accuracy of temporary designation is improved.

Next, the instrument point setting unit 431 calculates coordinates of the temporarily designated instrument point $P_1$, and transmits the coordinates to the processing PC 6. Accordingly, the instrument point $P_1$ turns into a temporarily designated state, and display of "Temporarily designate" on the display 41 switches to display for selecting whether to determine the designation.

Next, in Step S106, in the processing PC 6, the observation data prediction calculating unit 602 synchronizes coordinate information of the temporarily designated next instrument point $P_1$ and the three-dimensional CAD design data 661. Then, the processing PC 6 calculates observation data prediction DP, that is, point cloud data predicted to be acquired by the scanner 2 when the scanner 2 is installed at the next instrument point, in consideration of performance of the scanner 2, that is, an irradiation distance of the distance-measuring light of the scanner 2, a pulse interval of the distance-measuring light, rotation speed setting of the scanner 2, and three-dimensional structures in the CAD design data 661.

Specifically, the scanner 2 acquires point cloud data by performing rotational scanning (full dome scanning) with the distance-measuring light 360° in the vertical rotation direction and 180° in the horizontal rotation direction from the instrument center. Therefore, a region in which point cloud data can be acquired extends in all directions horizontally and vertically around the coordinates of the instrument center.

Figure 11A:
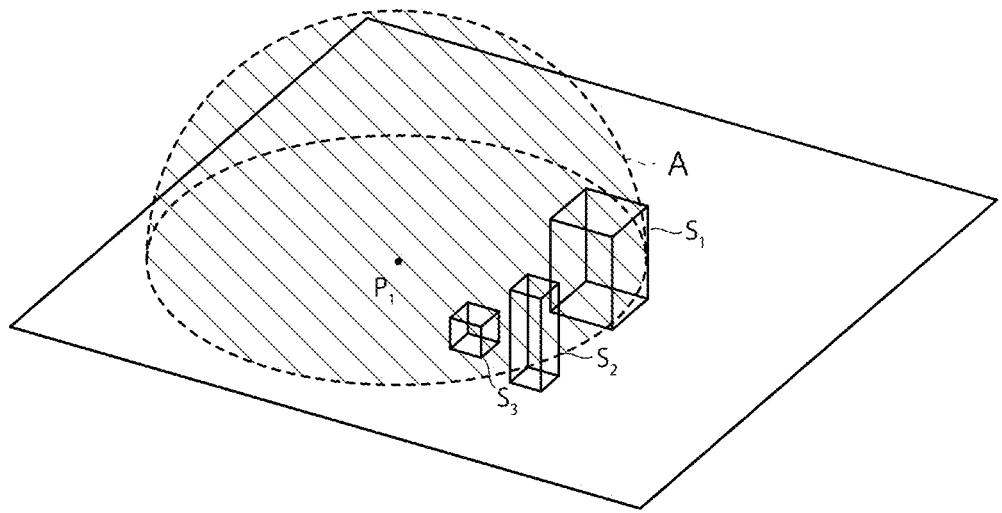
FIGS. 11A to 11C are diagrams describing a method for calculating observation data prediction in the display system described above.

In addition, point cloud density of the point cloud data becomes higher as the pulse interval of the distance-measuring light becomes narrower, becomes lower as the rotation speed of the scanner 2 becomes higher, and becomes lower with increasing distance from the scanner 2. In this way, the point cloud density depends on the pulse interval of the distance-measuring light, the irradiation distance of the distance-measuring light, and the rotation speed of the scanner 2. The scanner 2 is installed on the ground, and is relatively near the ground. Therefore, a point cloud data acquirable region A satisfying a predetermined point cloud density has the shape of a semispherical dome centered at the central coordinates of the scanner 2 as illustrated in FIG. 11A. For convenience, please keep in mind that the drawings are plotted on the assumption that the instrument center is at the same position as the point $P_1$ on the ground without regard for the instrument height, however, an actual instrument center is displaced upward from the point $P_1$ by the instrument height.

Figure 11B:
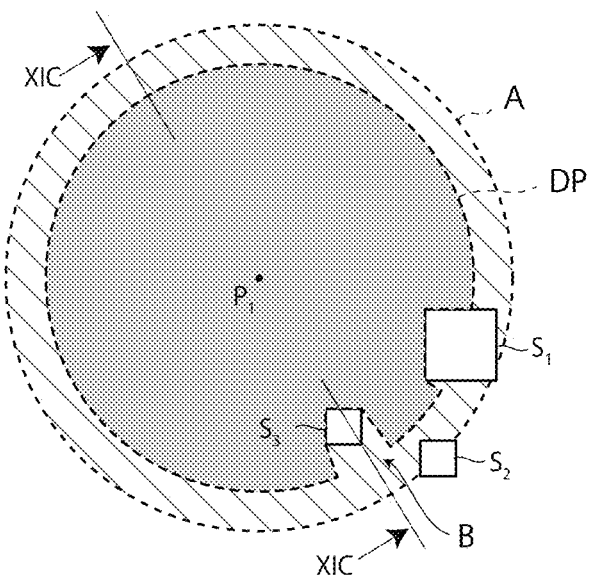
Figure 11C:
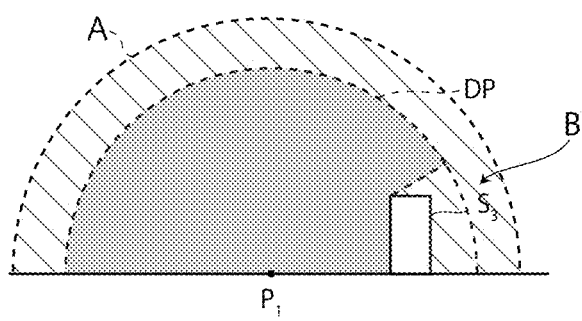

FIG. 11B is a sectional view along the ground plane surface of FIG. 11A, and FIG. 11C is a sectional view along line XIC-XIC in FIG. 11B. In the case of full dome scanning, in the point cloud data acquirable region A, the distance-measuring light is emitted radially in all directions from the instrument center of the scanner 2. When there are three-dimensional structures $S_1$, $S_2$, and $S_3$ in the point cloud data acquirable region, the distance-measuring light is reflected (shielded) by the three-dimensional structures $S_1$, $S_2$, and $S_3$, and the opposite side of the scanner 2 becomes a point cloud data unacquirable region B.

Therefore, the observation data prediction calculating unit 602 calculates a region in which point cloud data are predicted to be acquirable at a predetermined density or more as observation data prediction DP in consideration of the point cloud data acquirable region A obtained from the irradiation distance of the distance-measuring light and coordinates of the instrument center of the scanner 2, dispositions and shapes of three-dimensional structures and a three-dimensional positional relationship of the three-dimensional structures in the CAD design data 661, the irradiation distance of the distance-measuring light, the pulse interval of the distance-measuring light, and rotation speed setting of the scanner 2.

At this time, values of the irradiation distance of distance-measuring light of the scanner 2, the pulse interval of the distance-measuring light, and the rotation speed setting of the scanner 2 to be used for calculation of the observation data prediction DP, and a value of the instrument height of the scanner 2, etc., for obtaining central coordinates of the scanner 2, may be acquirable by the observation data prediction calculating unit 602 through the communication unit 3 of the scanner 2. Alternatively, these values may be input by a worker from the PC operation unit 65.

Figure 9C:
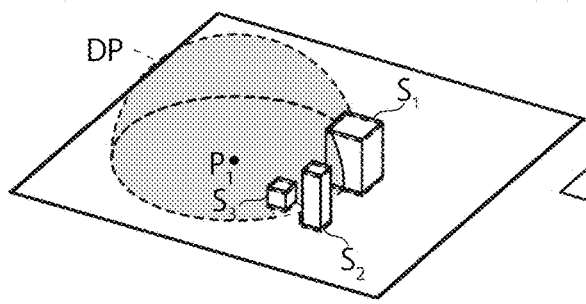

Next, in Step S107, the eyewear device 4 receives observation data prediction DP from the processing PC 6, and displays the observation data prediction DP illustrated in FIG. 9C on the display 41 by superimposing it on the actual landscape and the wire frame.

Figure 9D:
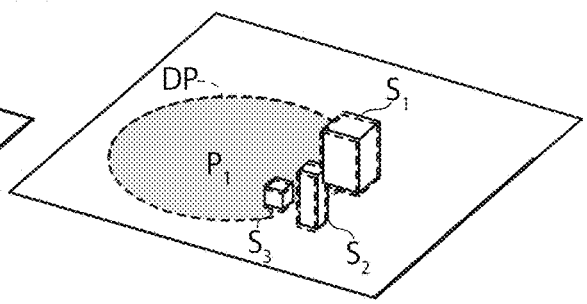

As a manner of display of the observation data prediction DP, for example, as illustrated in FIG. 9C, it may be three-dimensionally displayed. Alternatively, the observation data prediction DP may be two-dimensionally displayed on the ground plane surface of the observation site as illustrated in FIG. 9D. Alternatively, the three-dimensional display in FIG. 9C and the two-dimensional display in FIG. 9D may be switchable.

Figure 9E:
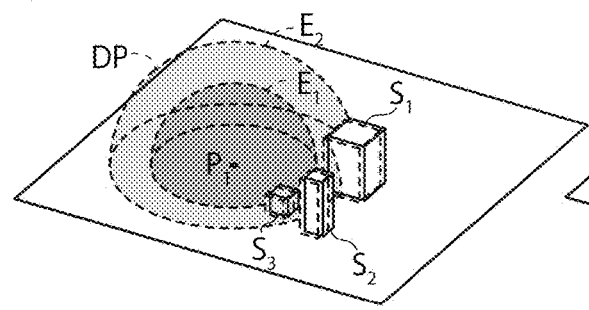

For example, as illustrated in FIG. 9E, a first region E1 with point cloud density falling within a desired range, and a second region E2 which is disposed at an outer circumferential side of the first region E1, and has point cloud density lower than that of the first region E1, which can realize desired overlapping by setting an instrument point after the next in this region and acquiring point cloud data, may be displayed in a distinguishable manner such as being displayed in different colors.

Figure 9F:
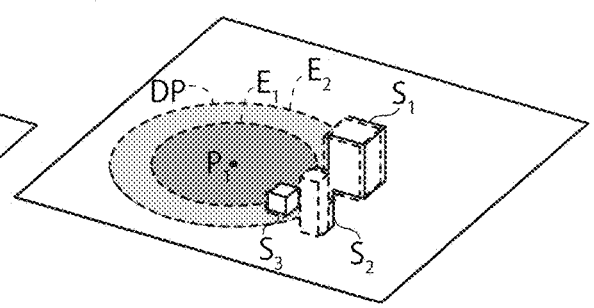

In the case of display in different colors, the first region E1 and the second region E2 may be shaded by similar colors (for example, the first region E1 is shaded by a dark color, and the second region E2 is shaded by a light color). In addition, as illustrated in FIG. 9F, the first region E1 and the second region E2 may be two-dimensionally displayed on the ground of the observation site.

Next, in Step S108, the worker visually confirms the observation data prediction DP displayed on the display 41 and determines whether to set the temporarily designated point as a next instrument point. When the worker is satisfied with the measurement region (Yes), the worker presses the function button 48β$_1$ (determination button), and accordingly, the processing shifts to Step S109, and the instrument point setting unit 431 determines the next instrument point, and outputs the next instrument point as determined next instrument point information to the processing PC 6 and ends the processing.

When the worker is not satisfied with the temporarily designated point in Step S108 (No), the worker resets the temporarily designated state by pressing the function button 48β$_3$. Then, the processing returns to Step S105, and the worker temporarily designates another point as a next instrument point P$_1$. The eyewear device 4 may be configured so as to be provided with a touch sensor on an outer surface of the goggles portion of the eyewear device 4 to determine a next instrument point P$_1$ by the worker touching the outer surface of the goggles.

Figure 10D:
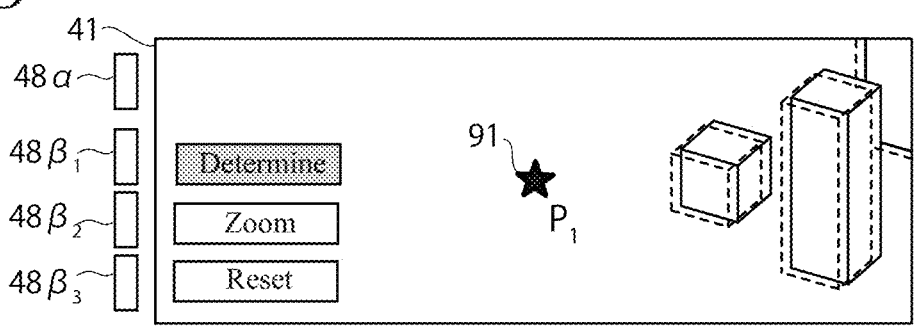

After the determination in Step S109, the next instrument point P$_1$ is displayed as, for example, a star so that it can be recognized as a determined point as illustrated in FIG. 10D. The worker marks the next instrument point on the actual ground surface while confirming the display of the determined instrument point and display of the actual landscape image on the display 41. This work may be performed by another worker according to a command from a worker wearing the eyewear device 4.

Then, the scanner 2 is installed at the determined instrument point P$_1$, and coordinates and a direction angle of the scanner 2 are measured by a method such as backward intersection. In addition, point cloud data observation is performed by the scanner 2.

Then, the worker sets a next instrument point P$_2$ in the same manner as in Steps S105 to S108. At this time, by setting a next instrument point P$_2$ in the second region E2, point cloud data overlapping becomes preferable. Then, by repeating Steps S101 to S109, point cloud observation is performed at respective instrument points P$_3$, P$_4$ . . . while setting the points in order, and accordingly, the entire observation site is observed. In the same observation site for which initial setting has been made once, setting of a reference point and a reference direction in Step S101 and synchronization of the eyewear device in Step S103 can be omitted.

At this time, not only the observation data prediction DP concerning the newly set instrument point, but also observation data prediction DP of instrument points previously set, may be cumulatively displayed. This is preferable because prediction of observation data of the entire observation site can be recognized.

As described above, the present embodiment is configured so that a next instrument point P$_1$ can be designated by using the eyewear device 4, and observation data prediction DP from the set instrument point P$_1$ is displayed to be superimposed on the actual landscape. As a result, an instrument point can be set while visually confirming the observation data prediction DP at the observation site, and point cloud observation can be efficiently performed while preventing remeasurement.

By displaying the observation data prediction DP in the shape of a three-dimensional semispherical dome, a worker can easily recognize an observable range. In addition, by two-dimensionally displaying the observation data prediction DP on the ground plane surface of the observation site, a next instrument point is designated on the ground plane surface, so that a region preferable for designation of an instrument point can be easily recognized.

By displaying the observation data prediction DP so that a first region E1 with point cloud density falling within a desired range, and a second region E2 which is disposed at an outer circumferential side of the first region E1, and has point cloud density lower than that of the first region E1, which can realize desired overlapping by setting an instrument point after the next in this region and acquiring point cloud data, are displayed in a distinguishable manner, a worker can clearly recognize a region preferable for setting a next instrument point. As a result, the worker can easily set a next instrument point that minimizes unnecessary overlapping while keeping point cloud data overlapping, so that the entire observation site can be efficiently measured.

Shading the first region E1 and the second region E2 by, for example, dark and light similar colors, is preferable because a worker can intuitively recognize an actual point cloud density difference.

Second Point Cloud Observation Method Using Display System 1

Figure 12:
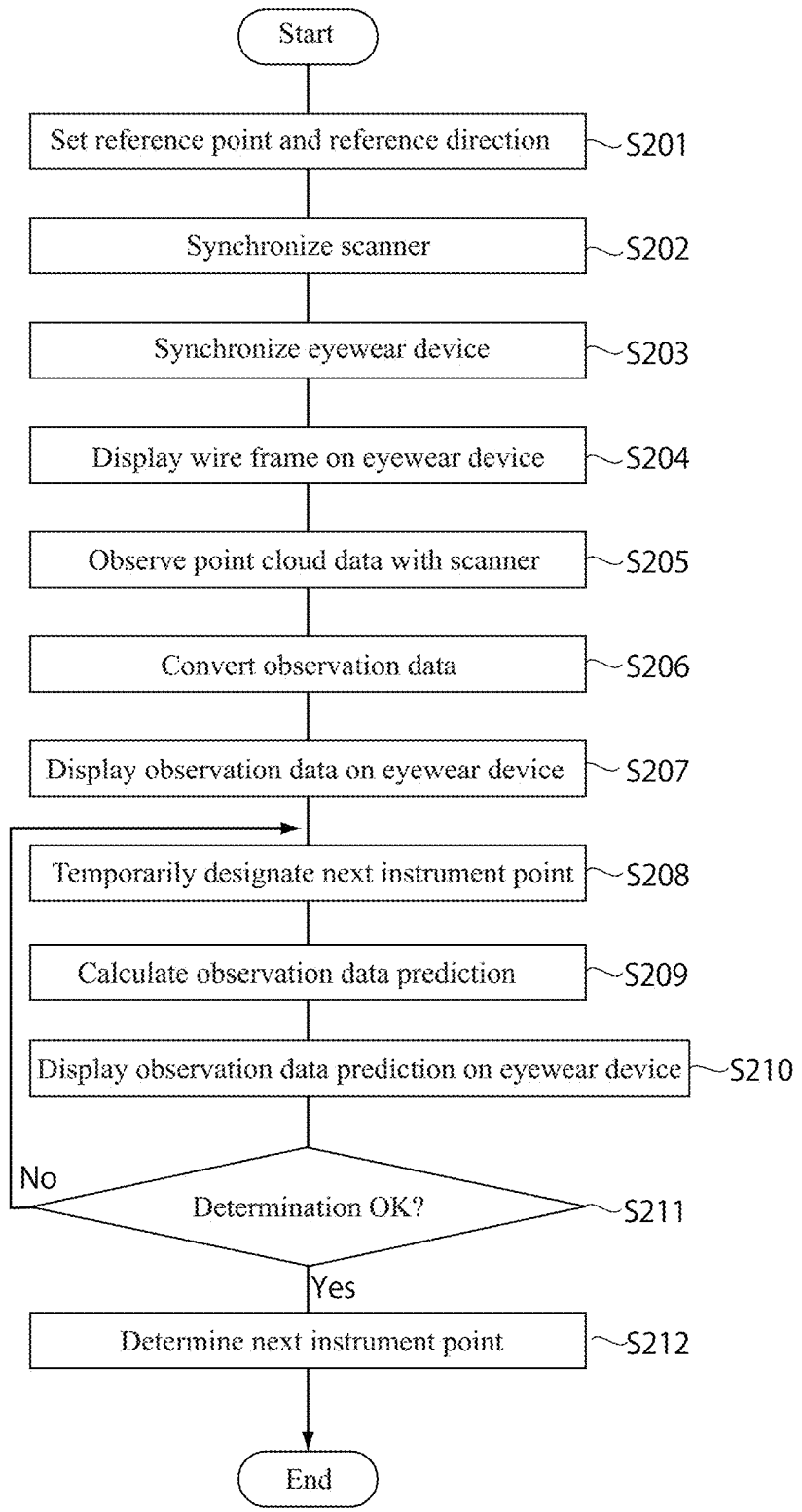
FIG. 12 is a flowchart of a second example of the point cloud observation method using the same display system.

Next, another example of the point cloud observation method using the display system 1 will be described. FIG. 12 is a flowchart of a second point cloud observation method. FIGS. 13A to 13E illustrate examples of display using the display system 1.

First, in Steps S201 to S204, in the same manner as in Steps S101 to S104, initial setting of the display system 1 is performed. In Step S202, the scanner 2 is installed at a first instrument point $P_0$.

Next, in Step S205, the scanner 2 performs point cloud data observation (full dome scanning) at the first instrument point $P_0$.

Next, in Step S206, the scanner 2 transmits observation data OD acquired by observation to the processing PC 6, and the synchronization measuring unit 601 converts the data into a synchronized coordinate system. The processing PC 6 transmits the synchronized observation data OD to the eyewear device 4, and the eyewear device 4 receives the observation data OD.

Next, in Step S207, the eyewear device 4 displays the observation data OD by superimposing it on the actual landscape and the wire frame on the display 41 (FIGS. 13A to 13D).

Figure 13A:
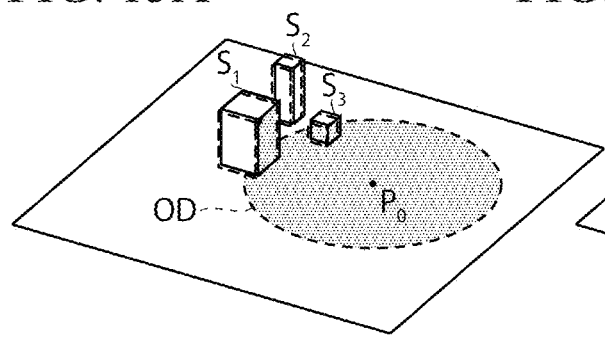
FIGS. 13A to 13E are bird's-eye views of images obtained by the display system in the same method.
Figure 13B:
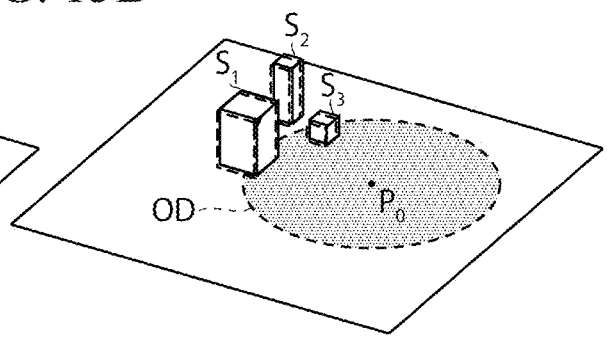

As a manner of display of the observation data OD, for example, as illustrated in FIG. 13A, the observation data OD may be three-dimensionally displayed. Alternatively, as illustrated in FIG. 13B, the observation data OD may be two-dimensionally displayed on the ground of the observation site.

Figure 13C:
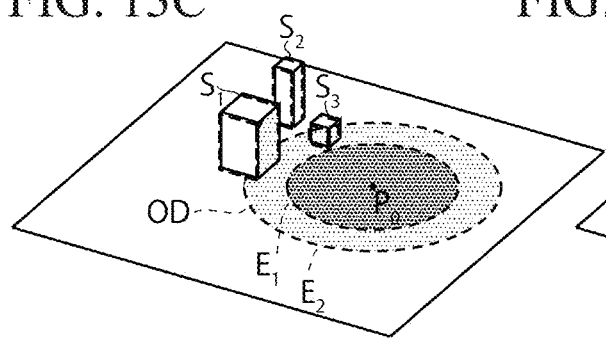

It is also possible that, for example, as illustrated in FIG. 13C, a first region E1 with point cloud density falling within a desired range, and a second region E2 which is disposed at an outer circumferential side of the first region E1, and has point cloud density lower than that of the first region E1, which can realize overlapping by setting an instrument point after the next in this region and acquiring point cloud data, may be displayed in a distinguishable manner such as being displayed in different colors.

Figure 13D:
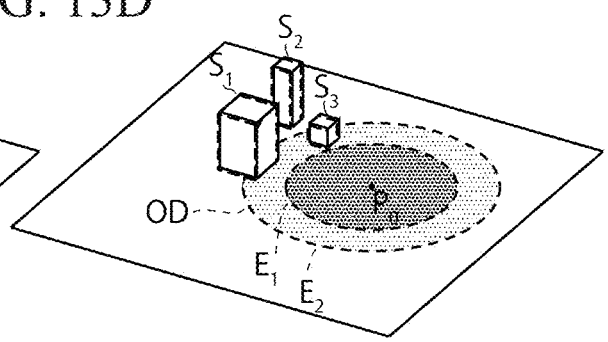
Figure 13E:
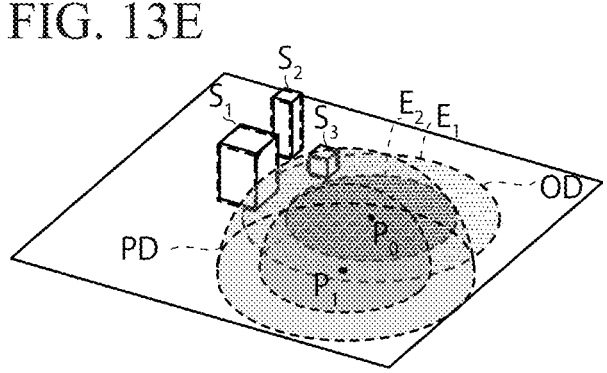

In the case of display in different colors, the first region E1 and the second region E2 may be shaded by similar colors (for example, the first region E1 is shaded by a dark color, and the second region E2 is shaded by a light color). In addition, as illustrated in FIG. 13D, the first region E1 and the second region E2 can be two-dimensionally displayed on the ground of the observation site. The display may be configured to be switchable between two-dimensional display and three-dimensional display.

Next, in Step S208, as in Step S105, the eyewear device 4 temporarily designates a next instrument point $P_1$ according to a worker's designation, and calculates coordinates of the next instrument point $P_1$ in the synchronized coordinate space, and transmits the coordinates to the processing PC 6.

Next, in Step S209, as in Step S106, the observation data prediction calculating unit 602 of the processing PC 6 calculates observation data prediction DP based on coordinates of the temporarily designated instrument point $P_1$, and transmits it to the eyewear device 4.

Next, in Step S210, as in Step S107, the observation data prediction DP is displayed on the eyewear device 4. FIG. 13D illustrates an example of display of the observation data prediction DP in the form illustrated in FIG. 9E on the observation data OD displayed in the form illustrated in FIG. 13B.

Next, in Step S211, as in Step S108, the worker visually confirms the observation data prediction DP displayed on the display 41, and determines whether to set the temporarily designated point as a next instrument point. When the worker is satisfied with the measurement region (Yes), the worker presses the function button $48\beta_1$ ("determination" button), and accordingly, the processing shifts to Step S212, and the instrument point setting unit 431 determines the next instrument point and ends the processing.

In Step S211, when the worker is not satisfied with the temporarily designated point (No), the worker resets the temporarily designated state, and temporarily re-designates another point as a next instrument point $P_1$.

In Step S212, the eyewear device 4 transmits coordinates of the determined next instrument point $P_1$ as next instrument point information to the processing PC 6.

The processing PC 6 stores the coordinate data of the next instrument point $P_1$ in the PC storage unit 66, and ends the processing.

When the next instrument point $P_1$ is determined, the worker marks it while watching the display on the display 41. Then, the worker installs the scanner 2 at the next instrument point $P_1$, and repeats Steps S201 to S212. By repeating this operation while setting next instrument points in order, point cloud observation of the entire observation site is performed. In the same observation site for which initial setting has been made once, it is not necessary to perform again setting of a reference point and a reference direction in Step S201 and synchronization of the eyewear device 4 in Step S203, and these operations may be omitted.

When repeating Steps S201 to S212, not only observation point cloud data at the newly designated instrument point, but also observation point cloud data of all points previously observed, may be cumulatively displayed.

In this method, observation data OD actually acquired by the scanner 2 is displayed to be superimposed on an actual landscape on the display 41 of the eyewear device 4, and while watching this image, a next instrument point $P_1$ can be set. Setting of a next instrument point in consideration of overlapping of point clouds can be performed based on actually acquired observation data OD, so that a next instrument point can be accurately set, and point cloud observation can be efficiently performed while preventing remeasurement.

In the case of three-dimensional display of the observation data OD, three-dimensional overlapping of point clouds can also be taken into account, so that more accurate setting of a next instrument point $P_1$ can be made.

When the observation data OD is two-dimensionally displayed on a ground plane surface, a next instrument point $P_1$ is set on the ground plane surface, so that visibility during setting is improved.

Further, by displaying observation data prediction DP when the scanner 2 is installed at a next instrument point set based on display of observation data OD, the next instrument point $P_1$ can be set, so that the next instrument point can be accurately selected, and observation efficiency is improved in the entire observation site.

When displaying the observation data OD, by displaying in a distinguishable manner a first region E1 with point cloud density falling within a desired range, and a second region E2 which is disposed at an outer circumferential side of the first region E1, and has point cloud density lower than that of the first region E1, which can realize overlapping by setting an instrument point after the next in this region and acquiring point cloud data, a next instrument point can be reliably set in the second region E2.

In this method, the observation data OD actually acquired by the scanner 2 can be displayed on the display 41 of the eyewear device 4 so as to be superimposed on the actual landscape, so that by cumulatively displaying observation data OD at respective points, whether data has been properly acquired at this site can be visually confirmed, and therefore, remeasurement after bringing back the data to the office can be prevented.

In addition, in this method, a next instrument point can be set upon confirming of observation data OD actually acquired by the scanner 2. For example, even when the observation site includes things such as passage of a person, vehicle, and bicycle, etc., electric wires, and trees which cannot be expected from the CAD design data 661 but become obstacles to acquisition of point cloud data, a next instrument point can be set accordingly, so that omission in data acquisition can be prevented, and remeasurement can be prevented.

Modification 1

Figure 14:
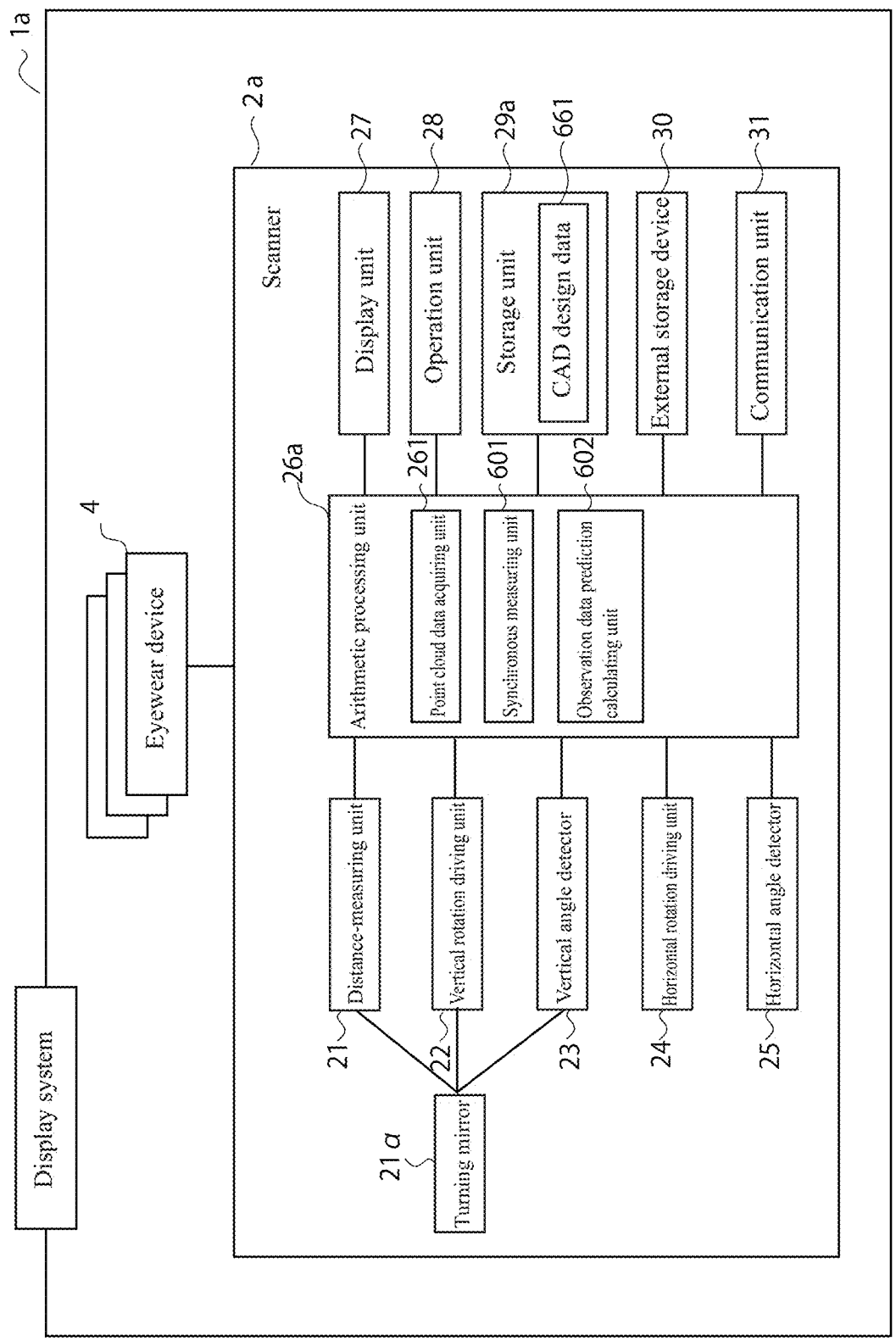
FIG. 14 is a configuration block diagram of a display system according to a modification of the same embodiment.

FIG. 14 is a configuration block diagram of a display system 1a according to a modification of the display system 1.

The display system 1a includes a scanner 2a and the eyewear device 4, and does not include the processing PC 6. The scanner 2a includes the synchronization measuring unit 601 and the observation data prediction calculating unit 602 in an arithmetic processing unit 26a, and includes the CAD design data 661 in a storage unit 29a. That is, in the present modification, the arithmetic processing unit 26a of the scanner 2a is a data processing device, and the storage unit 29a is a storage device.

The present modification is realized when the scanner 2a includes a high-performance arithmetic processing unit 26a and a small-sized high-capacity storage unit 29a, and can further simplify the configuration of the display system 1a.

Modification 2

Figure 15:
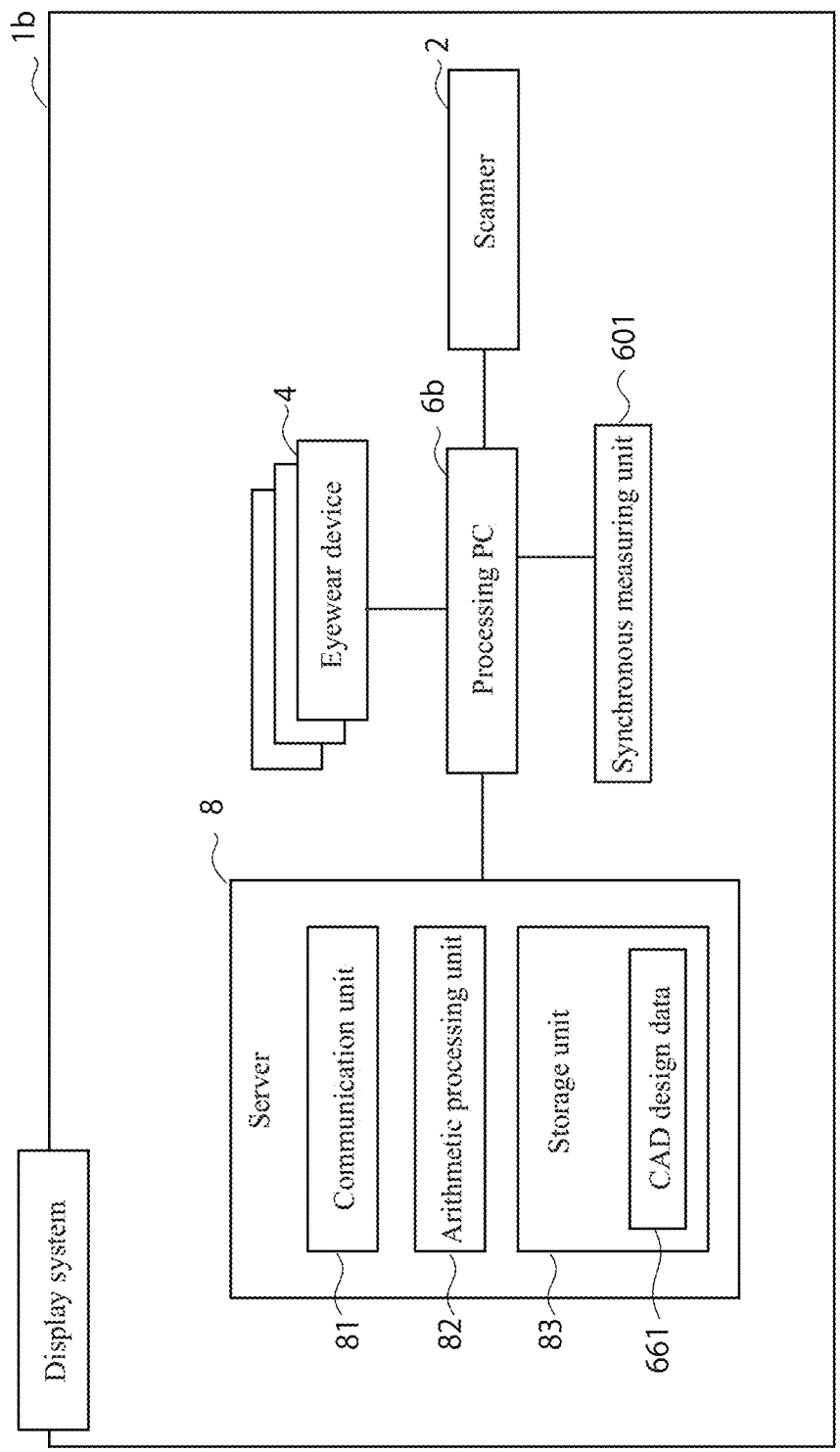
FIG. 15 is a configuration block diagram of a display system according to another modification of the same embodiment.

FIG. 15 is a configuration block diagram of a display system 1b according to another modification of the embodiment. The display system 1b includes the scanner 2, the eyewear device 4, a processing PC 6b, and a server 8. The server 8 includes at least a communication unit 81, an arithmetic processing unit 82, and a storage unit 83.

In the present modification, CAD design data 661 are stored not in a PC storage unit 66 of the processing PC 6b but in the storage unit 83 of the server 8. The processing PC 6b acquires CAD design data 661 of a necessary portion from the server 8 through the PC communication unit 63 in Steps S104 and S204 of the operation flow according to the embodiment. In the present modification, the arithmetic processing unit 60 of the PC 6b is a data processing device, and the storage unit 83 of the server 8 is a storage device.

Accordingly, the burden on the PC storage unit 66 of the processing PC 6b can be reduced.

Modification 3

Figure 16:
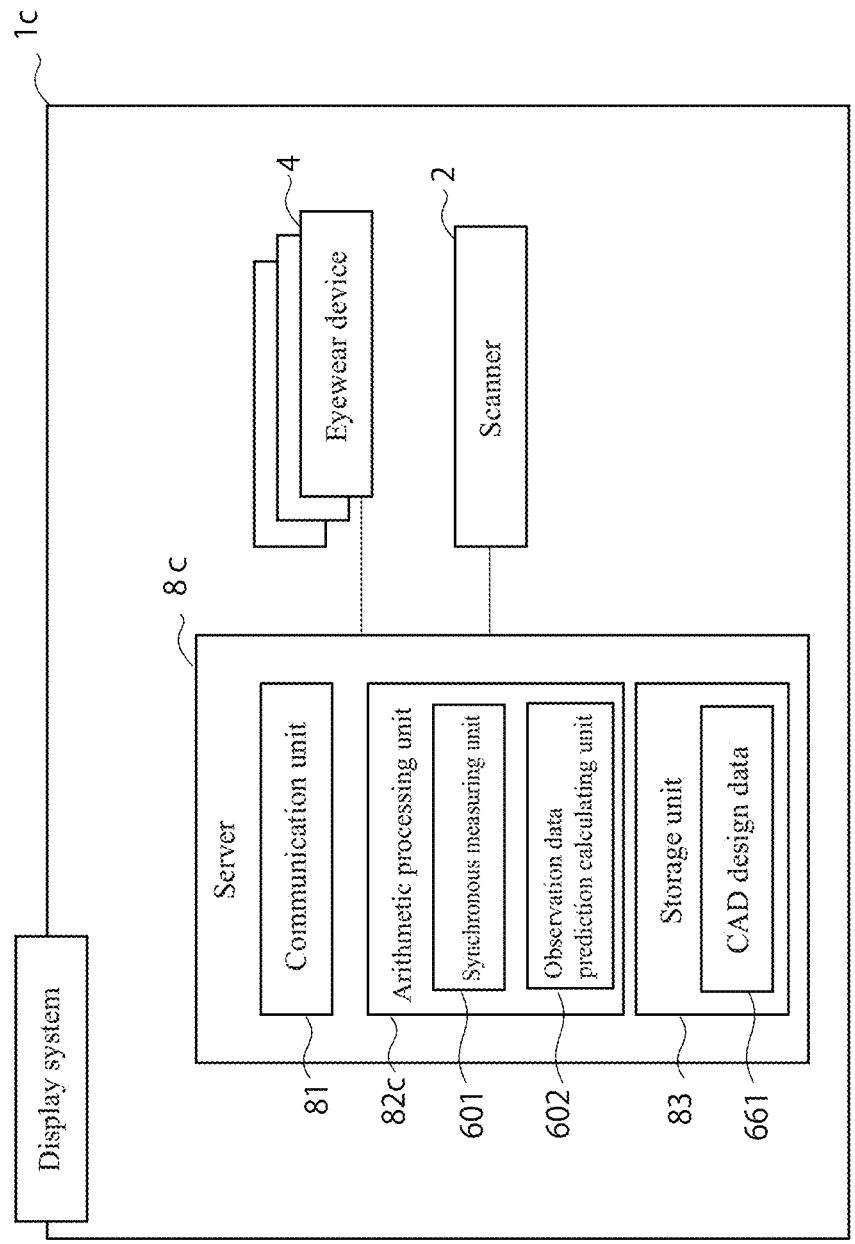
FIG. 16 is a configuration block diagram of a display system according to still another modification of the same embodiment.

FIG. 16 is a configuration block diagram of a display system 1c according to still another modification of the embodiment. The display system 1c does not include the processing PC 6, but includes the scanner 2, the eyewear device 4, and a server 8c. In the display system 1c, not the PC storage unit 66 but a storage unit 83 of the server 8c stores the CAD design data 661.

In addition, instead of the processing PC 6, an arithmetic processing unit 82c of the server 8c includes the synchronization measuring unit 601 and the observation data prediction calculating unit 602. That is, in the present modification, the arithmetic processing unit 82c of the server 8c is a data processing device, and the storage unit 83 of the server 8c is a storage device.

Accordingly, arithmetic processing in Steps S101 to S103, S201 to S203, and S106 can be increased in speed.

Modification 4

Figure 17:
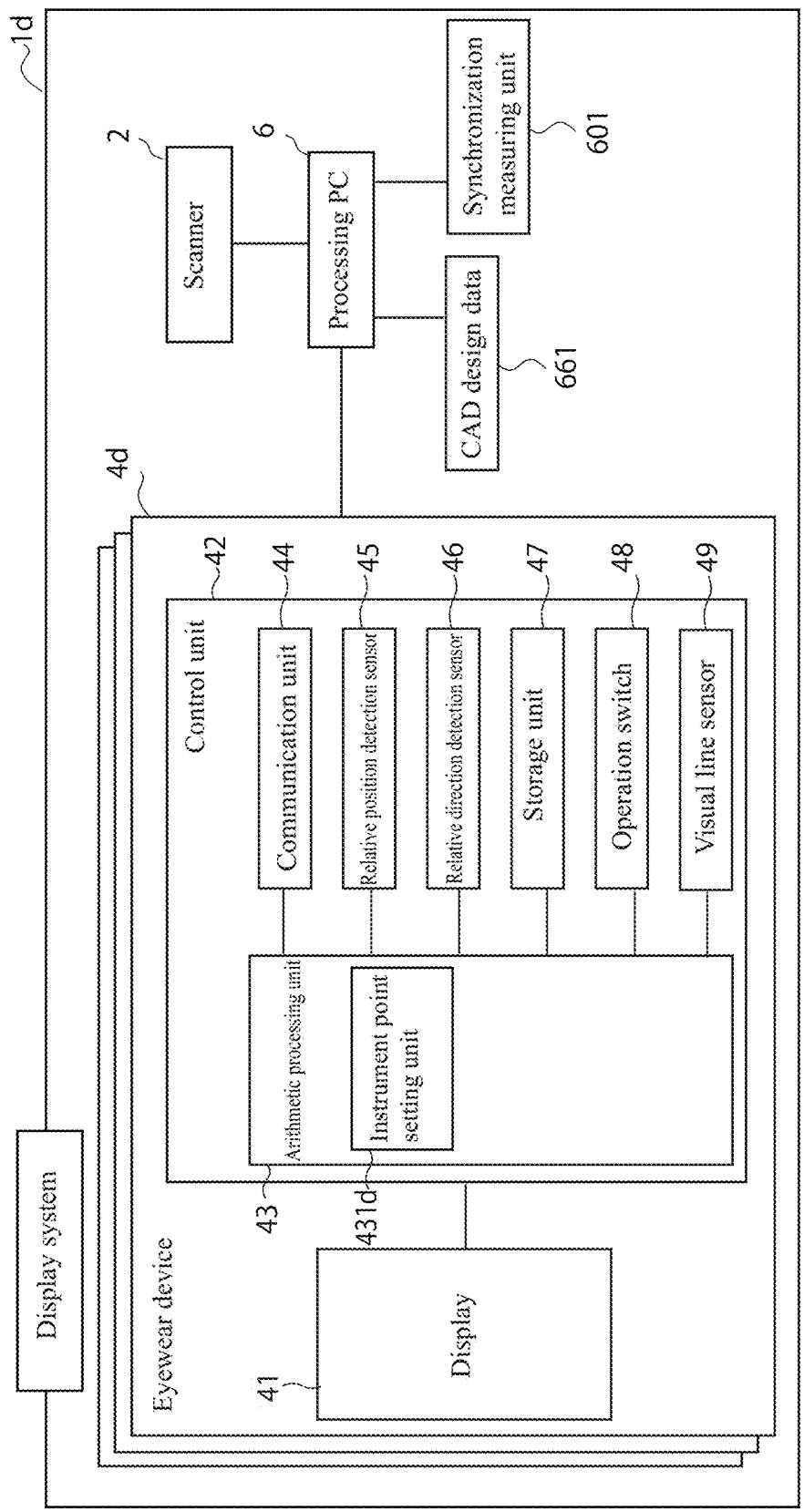
FIG. 17 is a configuration block diagram of a display system according to still another modification of the same embodiment.

FIG. 17 is a configuration block diagram of a display system 1d according to still another modification of the embodiment. The display system 1d includes an eyewear device 4d in place of the eyewear device 4 of the display system 1.

The eyewear device 4d has roughly the same configuration as that of the eyewear device 4, but further includes a visual line sensor 49. The eyewear device 4d includes an instrument point setting unit 431d in place of the instrument point setting unit 431.

The visual line sensor 49 is provided at a rear side of the display 41 (the face side of a worker wearing the eyewear device 4). The visual line sensor 49 is an image sensor such as a CCD sensor or a CMOS sensor. The visual line sensor 49 detects a line of vision of a worker based on a positional relationship between an eye inner corner position and an iris position of the worker.

The instrument point setting unit 431d sets a position of the line of vision of the worker on the display 41 as a next instrument point by the visual line sensor 49, and calculates coordinates of the next instrument point.

Specifically, in Step S105, when an instrument point setting mode is selected, the worker turns his/her eyes toward the next instrument point. The instrument point setting unit 431d temporarily designates a position of the last viewpoint on the display 41 as a next instrument point in response to one blink of the worker.

In Step S108, the worker visually confirms the observation data prediction DP displayed on the display 41 and determines whether to set the temporarily designated point as a next instrument point, and when the worker is satisfied with the measurement region (Yes), in response to two blinks of the worker, the processing shifts to Step S109, and the instrument point setting unit 431 determines the next instrument point. When the worker is not satisfied with the temporarily designated point (No), in response to closing of worker's eyes for a certain period of time, the temporarily designated state is reset.

With this configuration, the worker can set a next instrument point only by changing a viewpoint or closing the eyes, and the operation is easily performed.

Modification 5

Figure 18:
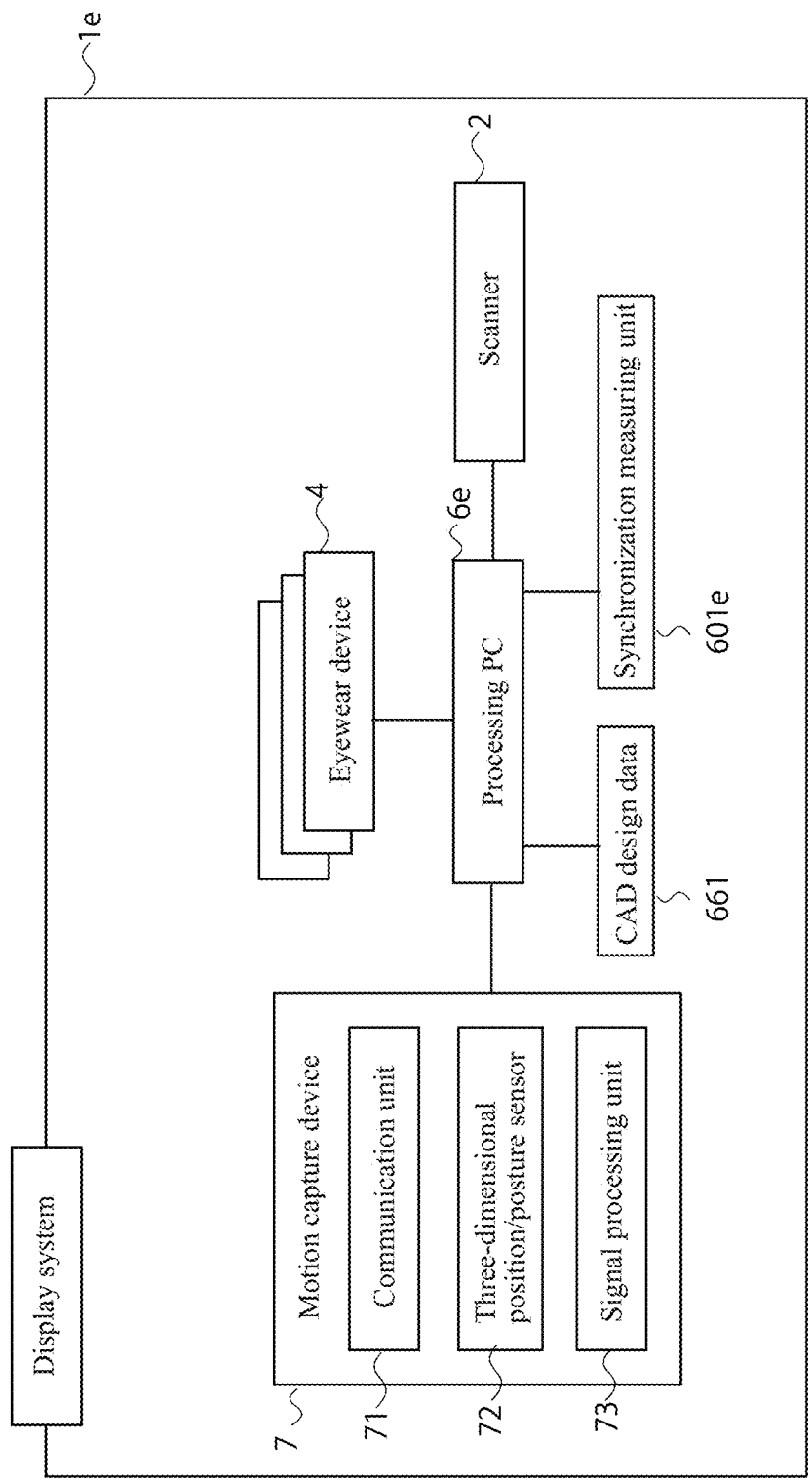
FIG. 18 is a configuration block diagram of a display system according to still another modification of the same embodiment.

FIG. 18 is a configuration block diagram of a display system 1e according to still another modification of the embodiment. The display system 1e includes, in addition to the configuration of the display system 1, a motion capture device 7. A processing PC 6e includes a synchronization measuring unit 601e in place of the synchronization measuring unit 601.

The motion capture device 7 is a so-called magnetic motion capture device. The motion capture device 7 includes a communication unit 71 that enables communication with the processing PC 6, a plurality of magnetic three-dimensional position/posture sensors 72 as devices to be worn on the fingers of a worker, and a signal processing unit 73 that outputs signals detected by the three-dimensional position/posture sensors 72 as worker's action information to the processing PC 6 in chronological order. As the three-dimensional position/posture sensor 72, for example, a motion capture device for finger using a magnetic position/posture sensor disclosed in JP2007-236602A is preferably used.

The motion capture device 7 is configured by disposing a plurality of three-dimensional position/posture sensors 72 on a flexible glove, and can detect fine motions of fingers.

Figure 19A:
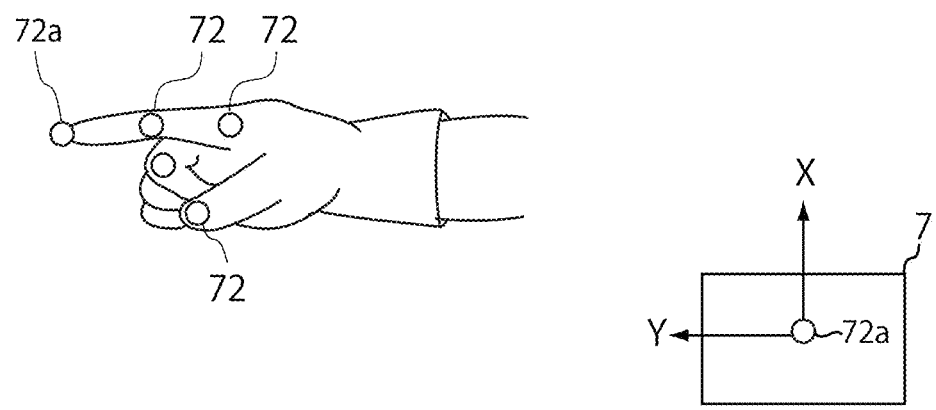
FIGS. 19A and 19B are diagrams describing a method for temporarily designating a next instrument point by using the same modification.

As illustrated in FIG. 19A, for example, by assuming a center of the sensor 72a positioned at a tip of the index finger as an origin, the motion capture device 7 acquires information on an Euler angle showing a posture obtained from position coordinates (x, y, z) of the sensors 72 viewed from a fixed reference point of the signal processing unit 73 and rotation angles around the X axis, Y axis, and Z axis. The Z axis passes through the origin of the XY plane, and is orthogonal to the XY plane in FIG. 19A.

In addition to the functions of the synchronization measuring unit 601, the synchronization measuring unit 601e has a function to manage information on a position and a direction received from the motion capture device 7 by converting the information so that the information matches the synchronized coordinate space of the scanner 2, the CAD design data 661, and the eyewear device 4.

For synchronization of the motion capture device 7, by locating the tip of the index finger of the worker wearing the motion capture device 7 at the reference point, and directing the tip of the index finger so as to match the reference direction of the scanner 2, etc., the position coordinates and the Euler angle are set to 0.

The eyewear device 4 is configured so that the fingers captured by the motion capture device 7 can be displayed on the display 41.

Figure 19B:
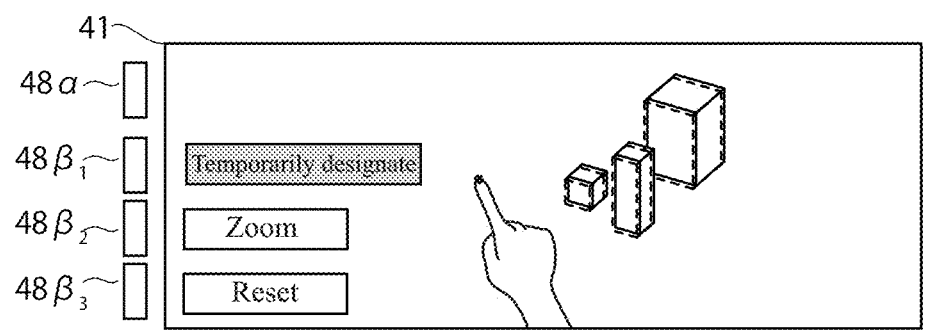

It is also possible that, in the instrument point setting mode in Step S105, an instrument point is designated by, as illustrated in FIG. 19B, pointing a point desired to be set as a next instrument point by the tip of the index finger on the display of the display 41.

With this configuration, the worker can temporarily designate a next instrument point by performing a simple operation of pointing at the point to be designated with his/her finger, so that the operation is easily performed.

Although preferred embodiments of the present invention have been described above, the embodiments described above are examples of the present invention, and these can be combined based on the knowledge of a person skilled in the art, and such combined embodiments are also included in the scope of the present invention.

REFERENCE SIGNS LIST

1, 1a, 1b, 1c: Display system
2, 2a: Scanner
26a: Arithmetic processing unit (data processing device)
261: Point cloud data acquiring unit
29a: Storage unit (storage device)
31: (Scanner) communication unit
4: Eyewear device
41: Display
431: Instrument point setting unit
44: (Eyewear device) communication unit
45: Relative position detection sensor
46: Relative direction detection sensor
6, 6b, 6c: Processing PC
60, 160: Arithmetic processing unit (data processing device)
601: Synchronization measuring unit
602: Observation data prediction calculating unit
63: PC communication unit
66: PC storage unit
661: CAD design data
81: (Server) communication unit
82: Arithmetic processing unit (data processing device)
E1: First region
E2: Second region

The invention claimed is:

1. An eyewear display system comprising:
a scanner including a measuring unit configured to irradiate distance-measuring light, and acquire three-dimensional coordinates of an irradiation point by measuring a distance and an angle to the irradiation point, a point cloud data acquiring unit configured to acquire point cloud data by rotationally irradiating distance-measuring light in a vertical direction and a horizontal direction by the measuring unit, and a communication unit;
an eyewear device including a display, a relative position detection sensor configured to detect a position of the eyewear device, a relative direction detection sensor configured to detect a direction that the eyewear device faces, and a communication unit;
a storage device including CAD design data of an observation site; and
a data processing device including a processor and a memory, the processor configured to receive information on a position of the scanner and a direction of the scanner and information on a position and a direction of the eyewear device, and synchronize a coordinate space of the scanner, a coordinate space of the eyewear device, and a coordinate space of the CAD design data,
wherein
the eyewear device is configured to be capable of temporarily designating a next instrument point which the scanner will be moved to and installed next, on the display by a worker, the eyewear device being configured to calculate coordinates of the next instrument point temporarily designated as a point on a ground surface in the synchronized coordinate space to output the calculated coordinates to the data processing device,
the data processing device includes an observation data prediction calculating unit configured to calculate coordinates of the next instrument point temporarily designated, calculate observation data prediction as the point cloud data to be acquired when the scanner is installed at the next instrument point based on the calculated coordinates, and output the observation data prediction to the eyewear device, and
the eyewear device displays the observation data prediction on the display by superimposing the observation data prediction on an actual landscape.

2. The eyewear display system according to claim 1, wherein the eyewear device displays the observation data prediction so that a first region with point cloud density falling within a predetermined range and a second region disposed at an outer circumferential side of the first region are distinguishable.

3. The eyewear display system according to claim 1, wherein the observation data prediction is two-dimensionally or three-dimensionally displayed or displayed to be switchable between being two-dimensionally displayed and three-dimensionally displayed.

4. The display system according to claim 1, wherein the observation data prediction is calculated in consideration of performance of the scanner and a three-dimensional structure in the CAD design data.

5. The eyewear display system according to claim 1, wherein the eyewear device displays point cloud data so that a first region with point cloud density falling within a desired range and a second region disposed at an outer circumferential side of the first region are distinguishable by displaying the first region and the second region in different colors.

6. The display system according to claim 1, wherein the observation data prediction calculating unit determines the next instrument point by overlapping regions based upon a cloud point density of the overlapping regions.

7. The eyewear display system according to claim 1, wherein the eyewear display device displays a pointer on the display, temporarily designates a point on the ground surface by placing the pointer as the next instrument point according to the worker's designation and calculate the coordinates of the next instrument point.

8. The eye wear display system according to claim 1, wherein the eyewear display device is configured to zoom the display on temporarily designating the next instrument.

9. The eyewear display system according to claim 1, wherein the eyewear display device includes a visual sensor, the eyewear display device is configured to temporarily designate a position of a line of vision of the worker on the display as a next instrument point by the visual line sensor.

10. The eyewear display system according to claim 1 further comprising a motion capture device configured by disposing a plurality of three-dimensional position/posture sensors on a flexible glove and configured to be capable of communicating with the data processing device, wherein
the processor is configured to manage information on a position and a direction received from the motion capture device by converting the information so that the information matches the synchronized coordinate space of the scanner, the CAD design data, and the eyewear device, and
the eyewear device is configured to temporarily designate a point pointed with a tip of a finger on the display by the worker wearing the glove as the next instrument point.

* * * * *